US011184323B2

(12) United States Patent
Coleman et al.

(10) Patent No.: US 11,184,323 B2
(45) Date of Patent: Nov. 23, 2021

(54) THREAT ISOLATION USING A PLURALITY OF CONTAINERS

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc, New York, NY (US)

( * ) Notice: Subject to any disclaimer, the term of this patent is extended or adjusted under 35 U.S.C. 154(b) by 2 days.

(21) Appl. No.: 16/142,981

(22) Filed: Sep. 26, 2018

(65) Prior Publication Data

US 2019/0098019 A1    Mar. 28, 2019

Related U.S. Application Data

(60) Provisional application No. 62/564,488, filed on Sep. 28, 2017.

(51) Int. Cl.
*H04L 29/06* (2006.01)
*G06F 21/56* (2013.01)
*G06F 21/53* (2013.01)

(52) U.S. Cl.
CPC .......... *H04L 63/0218* (2013.01); *G06F 21/53* (2013.01); *G06F 21/566* (2013.01); *H04L 63/20* (2013.01)

(58) Field of Classification Search
CPC ... H04L 63/145; H04L 63/0218; H04L 63/20; G06F 21/52; G06F 21/566; G06F 21/56;
(Continued)

(56) References Cited

U.S. PATENT DOCUMENTS 7,150,040 B2   12/2006   Brownell
7,467,408 B1   12/2008   Otoole, Jr.
(Continued)

FOREIGN PATENT DOCUMENTS

RU   2406138 C1   12/2010

OTHER PUBLICATIONS

Barnet, Mark, "Praktikum Po Zaschite Seti Kompanii", Windows IT Pro/RE, Nov.-Dec. 2006, 4 pages.
(Continued)

*Primary Examiner* — Kristine L Kincaid
*Assistant Examiner* — Shaqueal D Wade-Wright
(74) *Attorney, Agent, or Firm* — Condo Roccia Koptiw LLP

(57) ABSTRACT

Methods and systems are disclosed for implementing one or more isolated computing environment via one or more memory spaces. The isolated computing environment may be configured to execute one or more sandboxed applications and/or processes associated with the isolated computing environment. One or more firewalls may be associated with the one or more sandboxed containers. One or more firewalls may be configured to apply a set of criteria (e.g., policies) to each of the applications and/or processes. In examples, the one or more sandbox firewalls may exist for each of the applications and/or processes and may prevent unauthorized communications between the applications and/or processes. In examples, a sandbox firewall may be configured to apply a set of criteria to one or more applications and/or processes associated with the one or more isolated computing environments. The sandbox firewall may be configured to allow authorized communications between the applications and/or processes.

18 Claims, 5 Drawing Sheets

(58) Field of Classification Search
CPC ........ G06F 21/62; G06F 21/604; G06F 21/57; G06F 21/53
See application file for complete search history.

(56) References Cited

U.S. PATENT DOCUMENTS

| | | | |
|---|---|---|---|
| 7,478,330 | B1 | 1/2009 | Branson et al. |
| 7,694,328 | B2 | 4/2010 | Joshi et al. |
| 7,698,442 | B1 | 4/2010 | Krishnamurthy et al. |
| 7,716,720 | B1 | 5/2010 | Marek et al. |
| 7,805,516 | B2 | 9/2010 | Kettler et al. |
| 7,870,153 | B2 | 1/2011 | Croft et al. |
| 7,926,086 | B1* | 4/2011 | Violleau ............... G06F 21/629 726/1 |
| 8,090,797 | B2 | 1/2012 | Chinta et al. |
| 8,539,561 | B2 | 9/2013 | Pingali et al. |
| 8,566,398 | B2 | 10/2013 | Barnier et al. |
| 8,613,070 | B1 | 12/2013 | Borzycki et al. |
| 8,769,268 | B2 | 7/2014 | Morozov et al. |
| 8,931,054 | B2 | 1/2015 | Huynh et al. |
| 8,966,464 | B1 | 2/2015 | Christopher et al. |
| 9,294,492 | B1 | 3/2016 | Martini et al. |
| 9,386,021 | B1 | 7/2016 | Pratt |
| 9,438,634 | B1 | 9/2016 | Ross et al. |
| 9,465,734 | B1* | 10/2016 | Myrick ............... G06F 12/0246 |
| 9,531,715 | B1 | 12/2016 | Rodgers et al. |
| 9,560,081 | B1* | 1/2017 | Woolward .......... H04L 63/0263 |
| 9,602,524 | B2 | 3/2017 | Ghosh et al. |
| 9,609,026 | B2 | 3/2017 | Ross et al. |
| 9,680,873 | B1 | 6/2017 | Halls et al. |
| 9,729,579 | B1 | 8/2017 | Marino et al. |
| 9,787,639 | B1* | 10/2017 | Sun ........................ H04L 63/20 |
| 9,864,600 | B2 | 1/2018 | Larimore et al. |
| 9,921,860 | B1 | 3/2018 | Banga et al. |
| 9,942,198 | B2* | 4/2018 | Hoy .................... H04L 63/0272 |
| 10,037,199 | B2 | 7/2018 | Hung et al. |
| 10,055,231 | B1 | 8/2018 | Li et al. |
| 10,122,703 | B2 | 11/2018 | Innes et al. |
| 10,397,273 | B1 | 8/2019 | Stickle et al. |
| 10,521,612 | B2 | 12/2019 | Arad et al. |
| 10,554,475 | B2 | 2/2020 | Weinstein et al. |
| 10,558,798 | B2 | 2/2020 | Weinstein et al. |
| 10,931,669 | B2 | 2/2021 | Coleman et al. |
| 2002/0023212 | A1 | 2/2002 | Proudler |
| 2002/0040439 | A1 | 4/2002 | Kellum |
| 2002/0069366 | A1 | 6/2002 | Schoettger |
| 2002/0069369 | A1 | 6/2002 | Tremain et al. |
| 2005/0144467 | A1 | 6/2005 | Yamazaki |
| 2006/0070066 | A1 | 3/2006 | Grobman |
| 2006/0282795 | A1 | 12/2006 | Clark et al. |
| 2007/0136579 | A1 | 6/2007 | Levy et al. |
| 2007/0220187 | A1 | 9/2007 | Kates |
| 2007/0260873 | A1 | 11/2007 | Hatfalvi et al. |
| 2008/0016313 | A1 | 1/2008 | Murotake et al. |
| 2008/0028401 | A1 | 1/2008 | Geisinger |
| 2008/0201711 | A1 | 8/2008 | Amir Husain |
| 2008/0256536 | A1 | 10/2008 | Zhao et al. |
| 2009/0055924 | A1 | 2/2009 | Trotter |
| 2009/0164994 | A1 | 6/2009 | Vasilevsky et al. |
| 2009/0172781 | A1 | 7/2009 | Masuoka et al. |
| 2009/0249472 | A1 | 10/2009 | Benjamini et al. |
| 2009/0265760 | A1 | 10/2009 | Zhu et al. |
| 2009/0328038 | A1 | 12/2009 | Yamada et al. |
| 2010/0138829 | A1 | 6/2010 | Hanquez et al. |
| 2010/0138830 | A1 | 6/2010 | Astete et al. |
| 2010/0223613 | A1 | 9/2010 | Schneider |
| 2010/0251329 | A1 | 9/2010 | Wei |
| 2011/0154431 | A1* | 6/2011 | Walsh ..................... G06F 21/53 726/1 |
| 2011/0299515 | A1 | 12/2011 | Robertson et al. |
| 2012/0017213 | A1* | 1/2012 | Hunt ....................... G06F 21/53 718/100 |
| 2012/0023593 | A1 | 1/2012 | Puder et al. |
| 2012/0054744 | A1 | 3/2012 | Singh et al. |
| 2012/0265976 | A1 | 10/2012 | Spiers et al. |
| 2013/0132948 | A1 | 5/2013 | Hari et al. |
| 2013/0145463 | A1 | 6/2013 | Ghosh et al. |
| 2013/0318594 | A1 | 11/2013 | Hoy et al. |
| 2014/0040979 | A1 | 2/2014 | Barton et al. |
| 2014/0059642 | A1 | 2/2014 | Deasy et al. |
| 2014/0075535 | A1 | 3/2014 | Softer et al. |
| 2014/0108558 | A1 | 4/2014 | Borzycki et al. |
| 2014/0115646 | A1 | 4/2014 | Rajgopal et al. |
| 2014/0282890 | A1 | 9/2014 | Li et al. |
| 2014/0344912 | A1 | 11/2014 | Chapman, II et al. |
| 2014/0351516 | A1 | 11/2014 | Larimore et al. |
| 2015/0156203 | A1 | 6/2015 | Giura et al. |
| 2015/0281176 | A1 | 10/2015 | Banfield |
| 2016/0057167 | A1 | 2/2016 | Bach |
| 2016/0134549 | A1 | 5/2016 | Abel et al. |
| 2016/0226834 | A1 | 8/2016 | Dawson |
| 2016/0246974 | A1* | 8/2016 | Broz ................... G06F 9/45558 |
| 2016/0248754 | A1 | 8/2016 | Jahr |
| 2016/0292694 | A1 | 10/2016 | Goldschlag et al. |
| 2017/0034174 | A1 | 2/2017 | Jägers |
| 2017/0076092 | A1* | 3/2017 | Kashyap ............... G06F 21/316 |
| 2017/0142144 | A1 | 5/2017 | Weinberger et al. |
| 2017/0180413 | A1 | 6/2017 | Petry et al. |
| 2017/0206351 | A1 | 7/2017 | Jay et al. |
| 2017/0208067 | A1 | 7/2017 | Sriramakrishnan |
| 2017/0250997 | A1 | 8/2017 | Rostamabadi et al. |
| 2017/0317978 | A1 | 11/2017 | Diaz-cuellar et al. |
| 2017/0353496 | A1* | 12/2017 | Pai ......................... H04L 63/10 |
| 2017/0359309 | A1 | 12/2017 | Bolte et al. |
| 2018/0027006 | A1 | 1/2018 | Zimmermann et al. |
| 2018/0115519 | A1* | 4/2018 | Bonomi .............. H04L 63/0428 |
| 2018/0139178 | A1 | 5/2018 | Gan |
| 2018/0196945 | A1 | 7/2018 | Kornegay et al. |
| 2018/0198824 | A1 | 7/2018 | Pulapaka et al. |
| 2018/0203995 | A1 | 7/2018 | Yuen et al. |
| 2018/0234422 | A1 | 8/2018 | Odom et al. |
| 2018/0276396 | A1* | 9/2018 | Yablokov ............. G06F 21/604 |
| 2018/0330257 | A1 | 11/2018 | Dodson et al. |
| 2018/0367528 | A1 | 12/2018 | Schwarz et al. |
| 2019/0097970 | A1 | 3/2019 | Coleman et al. |
| 2019/0097972 | A1 | 3/2019 | Coleman et al. |
| 2019/0098007 | A1 | 3/2019 | Coleman et al. |
| 2019/0098020 | A1 | 3/2019 | Martz et al. |
| 2019/0121961 | A1 | 4/2019 | Coleman et al. |
| 2019/0121962 | A1 | 4/2019 | Coleman et al. |
| 2019/0213325 | A1 | 7/2019 | Mckerchar et al. |

OTHER PUBLICATIONS

Burnett, Mark, "How I Secured One Company's Network", Using Log Parser, Virtualization, and A Little Psychology, Sep. 17, 2006, 4 pages.
Laverick, Mike, "Hypervisor Management and Optimization for Advanced Virtualization", Advanced Virtualization E-Book, 2010, 13 pages.
Li et al., "VSITE: A Scalable and Secure Architecture for Seamless L2 Enterprise Extension in the Cloud", 6th IEEE Workshop on Secure Network Protocols, Kyoto, Oct. 2010, pp. 31-36.
Reuben, Jenni Susan, "A Survey on Virtual Machine Security", TKK T-110.5290 Seminar on Network Security, Oct. 11-12, 2007, 5 pages.
Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at https://en.wikipedia.org/wiki/Hypervisor , retrieved on Dec. 2010, 6 pages.
Wikipedia, "Internet Protocol", Available at https://en.wikipedia.org/wiki/Internet_Protocol, retrieved on Dec. 2010, 5 pages.

(56) References Cited

OTHER PUBLICATIONS

Wikipedia, "Multiprotocol Label Switching", Available at https://en.wikipedia.org/wiki/Multiprotocol_Label_Switching, retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.
"NPL Search Term", Web Search History, 1 page.
Azab, et al., "SICE: A Hardware-Level Srongly Isolated Computing Environment for x86 Multi-Core Platforms", Proceedings of the 18th ACM Conference on Computer and Communications Security, Oct. 2011, pp. 375-388.
Bruckman, et al., ""Georgia Computes!": Improving the Computing Education Pipeline", Proceeding of the 40th ACM Technical Symposium on Computer Science Education, 2009, pp. 86-90.
Comodo, "Comodo Internet Security", Software Version 7.0, User Guide Version 7.0.111114, 2014, pp. 1-579.
Gupta, et al., "A Secure Architecture Design Based on Application Isolation, Code Minimization and Randomization", IEEE 6th Symposium on Security Analytics and Automation 2013, 2013, pp. 423-429.
Haq, et al., "Design and Implementation of Sandbox Technique for Isolated Applications", IEEE School of Computer Science and Technology, Beijing Institute of Technology, Beijing, China, 2016, pp. 557-561.
Hsu, et al., "Enforcing Least Privilege Memory Views for Multithreaded Applications", Proceedings of the 2016 ACM SIGSAC Conference on Computerand Communications Security, Oct. 2016, pp. 393-405.
Jauernig, et al., "Trusted Execution Environments: Properties, Applications, and Challenges", IEEE Computer and Reliability Societies, Resilient Security, Mar.-Apr. 2020, pp. 56-60.
Jung, et al., "An Architecture for Virtualization-Based Trusted Execution Environment on Mobile Devices", 2014 IEEE 11th International Conference on Ubiquitous Intelligence and Computing and 2014 IEEE 11th International Conference on Autonomic and Trusted Computing and 2014 IEEE 14th International Conference on Scalable Computing and Communications and, Associated Symposia/Workshops, 2014, pp. 540-547.
Kostiainen et al., "Dedicated Security Chips in the Age of Secure Enclaves", IEEE Computer and Reliability Societies; Hardware-Assisted Security, Sep.-Oct. 2020, pp. 38-46.
Le, et al., "Computing the Real Isolated Points of an Algebraic Hypersurface", International Symposium on Symbolic and Algebraic Computation, Aug. 24, 2020, 12 pages.
Liu, et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.
Srivastava, et al., "Tamper-Resistant, Application-Aware Blocking of Malicious Network Connections", School of Computer Science, Georgia Institute of Technology, 2008, pp. 39-58.
Yadav, et al., "Impact & Analysis of Virtual Workspace on Grid Computing", International Journal of Science & Technology (IJST), vol. 2, Issue 2, Apr. 2012, pp. 24-32.
Yee, et al., "Native Client: A Sandbox for Portable, Untrusted x86 Native Code", 2009 30th IEEE Symposium on Security and Privacy, 2009, pp. 79-93.

* cited by examiner

THREAT ISOLATION USING A PLURALITY OF CONTAINERS

CROSS-REFERENCE TO RELATED APPLICATION

This application claims the benefit of U.S. Provisional Application Ser. No. 62/564,488 filed Sep. 28, 2017, the contents of which are incorporated by reference herein.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware. Malfunction may include, but is not limited to system crash, unnecessary processor demand, and/or the loss of command and control.

The security and privacy of the user of the infected host computer system user may be compromised by malware. Information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions that the author of the downloaded malware may desire. For example, the malware may perform a reconnaissance of the infected host computer system, determine system privileges, access local files, access security tokens, and/or attempt infection or access of other network resources accessible from the infected computer system.

SUMMARY OF THE INVENTION

Methods and systems are disclosed for a sandboxed based Internet isolation in a network and/or on one or more computer systems. For example, a host computer system may include a firewall (e.g., an isolation firewall), an operating system, a plurality of memory spaces. The memory spaces may be isolated (e.g., segregated) from each other using one or more container processes (e.g., sandbox container process). The level of isolation between the memory spaces may vary depending on one or more applications or processes being executed in the different memory spaces. A firewall (e.g., a host-based firewall) may be configured to prevent unauthorized communication between the host computer system and one or more network resources on the local area network (LAN) (e.g., or at least one network destination), a networked computer system, and/or the Internet.

As an example, a first memory space may be configured to enable storage and/or operation of a workspace configured to execute a first set of one or more applications and/or processes running on an operating system of the host computer system. The workspace may be configured to enable user interaction with the applications and processes running on the operating system. In an example, the workspace may be used to operate local applications (e.g., applications that do not access the Internet or infrequently access the Internet) and/or applications deemed to present a relatively small risk of infection from malware.

In examples, a memory space (e.g., a second memory space) may be configured to enable storage and/or operation of a second set of one or more applications and/or processes. The second memory space may be associated with an isolated computing environment (e.g., a first isolated computing environment) configured to run on the operating system. The isolated computing environment may be configured to access a portion of the operating system resources (e.g., a different portion than the first memory space) and may be disallowed from accessing other operating system resources. For example, a second set of one or more applications and/or processes executed in the second memory space may include a browser process and/or other processes related to browsing the Internet. An isolated computing environment described herein may include, but not limited to, a sandboxed computing environment, a virtual machine computing environment, a hybrid of a sandboxed computing environment and a virtual machine computing environment, and/or the like.

In examples, a memory space (e.g., a third memory space) may be configured to enable storage and/or operation of a third set of one or more applications and/or processes. The third memory space may be associated with an isolated computing environment (e.g., a second isolated computing environment) configured to run on the operating system. The isolated computing environment may be configured to access a portion of the operating system resources (e.g., a different portion than the first and/or second memory space) and may be disallowed from accessing other operating system resources. For example, a third set of one or more applications and/or processes executed in the third memory space may include an email process and/or other processes related to accessing an email system.

Additional memory spaces and isolated computing environments may also be implemented for one or more other applications and/or processes. For example, word processing application, file sharing applications, remote desktop applications, video chat applications, system utilities, and/or the like may be configured to operate within one or more separate memory spaces (e.g., segregated memory spaces) associated with one or more additional isolated computing environments. The types of applications implemented in an isolated computing environment (e.g., each isolated computing environment), which applications may share a common isolated computing environment and/or the number of isolated computing environments, may depend on the system configuration.

The isolation and/or separation of the sandboxed computing environments may be enforced via one or more sandbox container processes. The one or more sandbox container processes may enforce the separation of system resources via segregating the sandboxed computing environments from each other and/or segregating the sandboxed computing environments from the host operating system (e.g., the first memory space). For example, a first sandbox container process may be configured to segregate the first sandboxed computing environment associated with the second memory space from the first memory space associated with the workspace and from other sandboxed computing environment(s) and/or memory space(s). A second sandbox container process may be configured to segregate the second sandboxed computing environment associated with the third memory space from the first memory space associated with the workspace and from other sandboxed computing environment(s) and/or memory space(s). The sandbox container process(es) may be configured to prevent data from being communicated between the sandboxed computing environment(s) and the workspace without an explicit user input. The sandbox container process(es) may be configured to prevent data from being communicated between the sandboxed computing environments unless the communication satisfies one or more set of criteria (e.g., criteria or rules associated with a firewall(s) per boundary) and/or an explicit user input.

The sandbox container process(es) may be configured to classify a network destination as trusted or untrusted, for example based on one or more of a whitelist and/or a blacklist. The whitelist may include a list of trusted network destinations. The blacklist may include a list of untrusted network destinations. The sandbox container process(es) may permit access to trusted network destinations via one or more of the first set of one or more applications and/or processes associated with the workspace. The sandbox container process(es) may permit access to trusted or untrusted network destinations via one or more of the applications and/or processes associated with the sandboxed computing environment(s) based on the configuration of, application(s) running within, intended usage of, and/or the like of the sandboxed computing environment(s). The whitelist and/or blacklist associated with destinations accessible by an application or process in a sandboxed computing environment may be specific to a given sandboxed computing environment. For example, a sandboxed computing environment associated with a browser application may be permitted to access any untrusted destination (e.g., or a relatively large number/variety of untrusted destinations), while a sandboxed computing environment associated with an email application may be permitted to access a relatively smaller subset of trusted destinations (e.g., such as email servers and/or specifically identified Internet resources).

The memory spaces associated with the sandboxed computing environments may be isolated from each other and/or from the first memory space associated with the workspace. The host computer system may be configured to consider a sandboxed computing environment as infected and/or untrusted, for example, assuming that the sandbox computing environment has received malware, for example from the Internet.

A firewall (e.g., a first firewall) may be configured to operate between the workspace of the first memory space and the LAN. The first firewall may be configured to prevent unauthorized communication between the first set of one or more applications and/or processes executing in the workspace and one or more other devices on the LAN. In an example, the first firewall may be configured to block incoming communications from one or more other devices on the LAN from reaching the workspace and/or the sandboxed computing environment(s) but may allow outgoing communications from the workspace and/or the sandboxed computing environment(s) to one or more other devices on the LAN.

The host computer system may include one or more sandbox-type firewalls. The sandbox-type firewall(s) may be implemented as a part of the sandbox container process(es). The sandbox-type firewall(s) may enforce a separation of the plurality of memory spaces. The sandbox-type firewall(s) may segregate storage memory associated with the workspace and the sandboxed computing environment(s). The sandbox-type firewall(s) may allow a predefined set of processes to be executed within the sandboxed computing environment(s). The sandbox-type firewall(s) may prevent execution in the sandboxed computing environment(s) of any processes outside of the predefined set of processes. The sandbox-type firewall(s) may prevent the (e.g., second set of) one or more applications and/or processes that operate within a sandboxed computing environment(s) from accessing resources or processes in the first memory space, other sandboxed computing environments, and/or other memory space(s). The sandbox-type firewall(s) may prevent the first set of one or more applications and/or processes that operate within the workspace from accessing resources and/or processes in the sandboxed computing environment(s) and/or other memory spaces. The sandbox-type firewall(s) may be configured such that an explicit user input allows one or more of a cut or copy of data, a paste of data, a printing of data to a local printer, and/or a file transfer to occur. The explicit user input may allow data to pass between the sandboxed computing environment(s), the workspace, other sandboxed computing environment(s), and/or memory space(s). Without such explicit user inputs, the sandbox-type firewall(s) may block or disallow transferring of data between the memory spaces.

In examples, the sandbox-type firewall(s) (e.g., associated with the sandboxed computing environment(s)) may be configured to prevent any communications (e.g., direct communications) between one or more applications and/or processes in different sandboxed computing environments. The sandboxed computing environment(s) may be configured to provide a firewall to each of the sandboxed computing environment(s). For example, the sandboxed computing environment(s) may be configured to provide a sandbox-type firewall(s) to segregate the one or more applications and/or processes that operates within the sandboxed computing environment(s) from any other memory spaces and their associated applications and/or processes.

In examples, the sandbox-type firewall(s) may be configured to allow communication (e.g., direct communication) between one or more sandboxed computing environments and/or the workspace, and one or more of their applications and/or processes, for example via a conduit between the communicating memory spaces. If the sandboxed computing environment determines that a preconfigured allowed list of processes are initiated, the sandboxed computing environment may implement a set of criteria (e.g., a set of rules) to allow the communication between one or more sandboxed computing environments and/or the workspace, and one or more of their applications and/or processes. The sandboxed computing environment may continue to allow the communication until the one or more applications and/or processes are completed. The sandboxed computing environment may be configured to halt (e.g., temporarily halt) the communication and may resume the communication between the one or more of the sandboxed computing environments and/or workspace, and the one or more applications and/or processes. The set of criteria described herein may include a set of rules. For example, if a memory space (e.g., that is configured to enable operation of one or more applications or processes via a corresponding sandboxed computing environment) meets a first set of criteria associated with the memory space, a firewall associated with the memory space is configured to allow data being communicated from the memory space to at least one of a workspace, another memory space (e.g., that is configured to enable operation of one or more applications or processes via a different sandboxed computing environment).

In examples, the sandbox container process(es) may be configured to provide a firewall interface (e.g., single firewall interface or an isolation firewall) for one or more (e.g., all) of the sandbox container processes (e.g., sandbox-type firewall(s) or sandbox firewall(s) associated with the sandboxed applications and/or processes). The firewall interface may be configured to provide an individual sandbox-type firewall policy for the (e.g., each of the) sandboxed computing environment(s). The sandbox-type firewall(s) may be configured (e.g., further configured) to allow communication (e.g., direct communication) between one or more sandboxed computing environments and the workspace and one or more of their applications and processes. In such cases, the sandbox-type firewall(s) may be a hybrid of the examples described herein. The sandbox-type firewall(s) may be configured to allow communications between one or more sandboxed computing environments and the workspace and one or more of their applications and/or processes one at a time. The sandbox-type firewall(s) may be configured to allow communications between one or more (e.g., multiple) sandboxed computing environments and/or the workspace, and one or more (e.g., multiple) of their applications and/or processes more than one at a time (e.g., simultaneously).

The first memory space may be configured to store a known good version of the sandbox container process(es). One or more of the first set of one or more applications and/or processes may be allowed to restore the sandbox container process(es) to the known good version. The workspace may include at least one host monitoring process configured to monitor the sandbox container process(es). The at least one host monitoring process may be configured to restore the sandbox container process(es) to the known good version based on one or more of a user input, an application input, detection of an abnormality in a sandbox container process, and/or expiration of a predefined time. The host computer system may be configured to store a restore point of a sandboxed computing environment. The restore point may be associated with a configuration of the sandboxed computing environment. The host computer system may be configured to detect anomalous behavior within a sandboxed computing environment. The host computer system may be configured to restore, e.g., based on detection of the anomalous behavior, a sandboxed computing environment to the restore point.

The networked computer system may include a proxy/web-content server, for example, between a sandboxed computing environment and untrusted network resources. The sandbox container process(es) may be configured to authenticate with the proxy/web-content server on behalf of the browser process, for example, using credentials stored in a configuration file of the sandbox container process(es). After authentication, the browser process may be allowed to access untrusted network resources via the proxy/web-content server. Each of a plurality of host computer systems comprised in the LAN may access untrusted network resources via the proxy/web-content server and may result in a decrease in total traffic monitored on the LAN.

DETAILED DESCRIPTION

Figure 1:
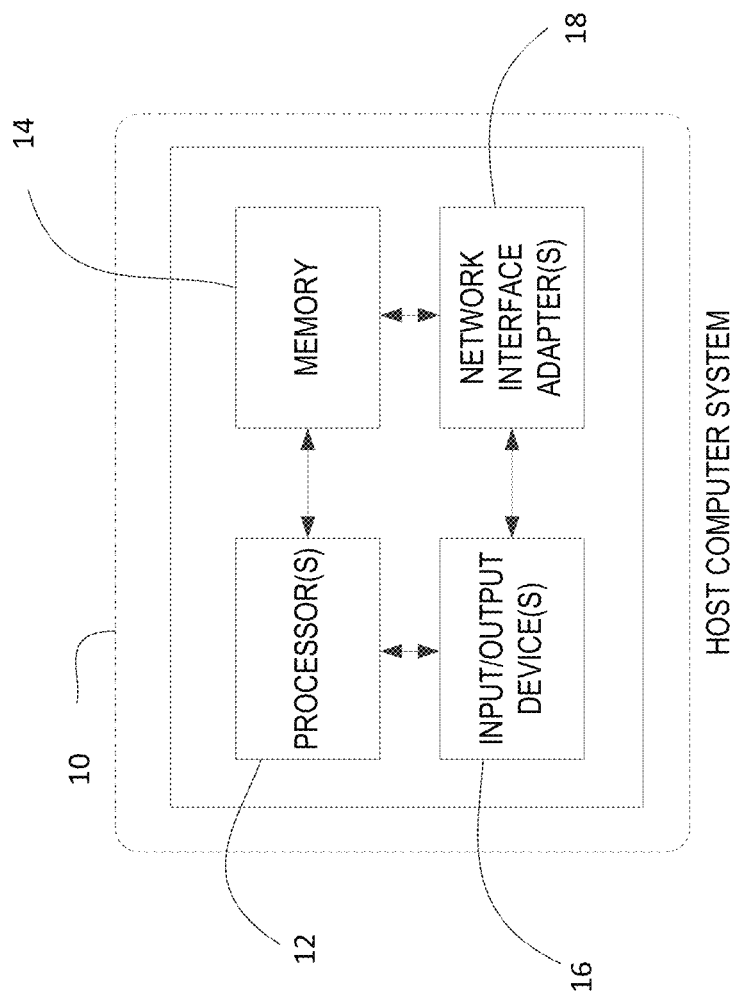
FIG. 1 depicts an example of a host computing system.

Systems and methods are disclosed for using sandbox based Internet isolation to limit and/or segregate security threats while connected to a local area network (LAN) (e.g., a trusted LAN and/or an untrusted LAN). A host computer system may securely browse, access, and/or communicate with untrusted network destinations, including but not limited to resources accessible via the Internet. The host computer system may be connected to a LAN, which may be a trusted LAN or an untrusted LAN, and may have a sandbox protected application (e.g., which may be referred to as a sandboxed application herein), such as a sandbox protected browser or sandboxed browser (e.g., for web browsing), a sandbox protected email application or sandboxed email application, one or more sandbox protected applications (e.g., such as word processor) or one or more sandboxed applications, and/or a sandbox container process (e.g., firewall) running thereon. In an example, a process/firewall may be configured for each isolated computing environment (e.g., sandboxed computing environment). In another example, a process/firewall may be configured for one or more isolated computing environments and/or one or more grouped isolated computing environments. Each application or application type may be isolated in a respective sandboxed computing environment. Each sandboxed computing environment may include resources (e.g., a limited set of resources) allocated for operation of the sandbox container process(es). The sandboxed computing environment(s) may be enforced via the sandbox container process(es). The sandbox container process(es) may be a security mechanism used to separate the sandboxed computing environment(s) from other memory spaces, applications and/or processes that may be running on a host computer system. A sandboxed container process may be configured to enable one or more applications and/or processes (e.g., such as a browser process, an email process, and/or the like) being executed within sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace, other sandboxed computing environments, and/or other memory spaces. The sandboxed computing environment may be configured to isolate the memory spaces by implementing one or more set of criteria (e.g., set of rules) to control the sandbox container process (e.g., firewall) as described herein.

In examples, a sandbox container process (e.g., firewall) may be configured to run for a (e.g., each) sandboxed computing environment, thereby protecting one or more applications running therein. For example, a first sandboxed computing environment may be configured to limit access between a first sandbox protected application and a second sandbox protected application. The process protecting the first sandboxed application may be configured (e.g., may also be configured) to limit (e.g., prevent) data transfer between the memory space associated with the first sandbox protected application in a first sandboxed computing environment and the second sandbox protected application in a second sandboxed computing environment.

In examples, one or more of the sandbox container processes (e.g., firewalls) associated with a sandboxed computing environment may be configured to allow limited access with other sandboxed computing environment(s). For example, one or more sandbox container processes (e.g., firewalls) associated with a first sandboxed computing environment may be configured to allow limited access between applications and/or processes contained in the first sandboxed computing environment and applications and/or processes contained in the other sandboxed computing environment(s). The one or more sandbox container processes (e.g., firewalls) associated with the first sandboxed computing environment may be configured to allow access from one or more applications or processes in the first sandboxed computing environment to one or more applications or processes in other sandboxed computing environment and/or the workspace if a set of criteria is met. The applications and/or processes contained in the other sandboxed computing environment(s) may be operating within other memory spaces than that of the first sandboxed computing environment. In an example, a first sandbox container process for a first sandboxed computing environment and the one or more applications that may be running within it (e.g., sandboxed application for email) may allow a limited access to/from a second sandboxed application in a second sandboxed computing environment (e.g., sandboxed application for word processor), and a second sandbox container process for the second sandboxed computing environment may allow similar (e.g., same) limited access. This may allow some limited access between particular sandboxed applications and applications and/or processes operating in other memory spaces (e.g., between the sandboxed email process and the sandboxed word processor), while other sandboxed computing environments, for example, other than the first and second sandboxed computing environments may have a sandbox container process that prevents access between itself and the first and second sandboxed computing environments. A sandboxed computing environment may have a predefined list of authorized access between applications and/or processes operating therein and applications and/or processes operating within other memory spaces. A sandboxed computing environment may determine whether one or more sandboxed applications and/or processes therein are authorized to access other memory spaces and the applications and/or processes that may be operating within it (e.g., real-time and/or without the predefined list), e.g., based on whether a set of criteria associated with a corresponding sandbox container processes (e.g., firewalls) has been satisfied.

In examples, the sandbox container process(es) may be configured to provide a firewall interface for one or more of the sandbox container processes (e.g., sandbox firewalls or sandbox-type firewalls or firewalls associated with the sandboxed applications and/or processes). For example, the sandbox container process(es) may be configured to provide a single firewall interface for all of the sandbox-type firewalls (e.g., associated with one or more sandboxed applications and/or processes running therein). In an example, the firewall interface may be configured to provide an individual sandbox-type firewall policy for each of the sandboxed computing environment(s). In another example, the firewall interface may be configured to provide two or more firewall policies. For example, the firewall interface may apply different policies (e.g., different criteria or different rules) for ingress and/or egress to a given sandboxed computing environment. In this manner, a single sandbox-type firewall may provide segregation among a plurality of sandboxed computing environments and may enforce the segregation between the environments using different firewall policies. The sandbox-type firewall may also apply different firewall policies (e.g., or different firewall criteria or different firewall rules) for the interface between a given sandboxed computing environment and the host workspace. In an example, the sandbox-type firewall(s) may be further configured to provide a group firewall policy for the sandboxed computing environment(s). For example, the sandbox-type firewall(s) may be further configured to allow communication (e.g., direct communication) between one or more sandboxed computing environments, and one or more of their applications and/or processes.

In an example, each sandboxed computing environment may be enforced by one or more separate or distinct sandbox-type firewall processes (e.g., also referred to as separate or distinct sandbox container processes). The sandbox-type firewall process for a given sandboxed computing environment may enforce policies (e.g., also referred to as criteria or rules) related to egress from or ingress to the sandboxed computing environment. The sandbox-type firewall process for a given sandboxed computing environment may enforce polices related to the data exchanged between the given sandboxed computing environment and the workspace. The sandbox-type firewall process for a given sandboxed computing environment may enforce polices related to the data exchanged between the given sandboxed computing environment and another sandboxed computing environment. If separate sandbox-type firewall processes are used for different sandboxed computing environments, for a given data transfer from a first sandboxed computing environment to a second sandboxed computing environment, the communication may need to satisfy the egress rules (e.g., criteria) of the first sandbox-type firewall process associated with the first sandboxed computing environment and the ingress rules (e.g., criteria) of the second sandbox-type firewall process associated with the second sandboxed computing environment.

The workspace may include one or more processes operating within the operating system that are not restricted by the sandbox container process(es). The operating system of the host computer system may include a set of resources configured to enable operation of the workspace and the sandbox container process(es).

The sandbox container process(es) may have access to one or more operating systems and/or kernel processes in order to enforce isolation between the workspace associated with the first memory space and the sandboxed computing environment(s) associated with the second memory space(s) (e.g., different memory space(s) than the first memory space). The sandbox container process(es) may enforce the segregation using techniques, such as namespace isolation, such that the processes running in the sandboxed computing environment(s) are restricted from accessing the first memory space including the workspace (e.g., and vice versa) and/or other memory spaces and the process(es) running therein. The sandbox container process(es) may restrict access to certain resources by processes running in the sandboxed computing environment. The sandboxed container process(es) may allow the workspace and the sandboxed computing environment(s) to share access to the host operating system and host operating resources (e.g., including the kernel and libraries) while enforcing the segregation of the memory spaces access by the workspace and the sandboxed computing environment(s). In this manner, the sandbox container process(es) may permit isolation of the sandboxed computing environment(s) without requiring the sandboxed computing environment(s) to boot a separate operating system(s), load separate libraries, etc., which would require separate private memory for those files.

A browser process operating within a sandboxed computing environment may be permitted to access untrusted network destinations via an access connection device. For example, the browser process operating within the sandboxed computing environment may connect to the untrusted network destinations as a dedicated network interface device using a specific Internet Protocol (IP) address. The browser process operating within the sandboxed computing environment may be referred to as a sandbox browser process or a sandboxed browser. The host computer system may maintain a list of untrusted network destinations and/or a list of trusted network destinations. The list of trusted network destinations may be a whitelist. The list of untrusted network destinations may be a blacklist. The whitelist and the blacklist may be refined based on username and/or machine identification (ID). For example, the lists of trusted and untrusted network destinations may be different for different users and/or machines associated with the trusted LAN. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the browser process operating within the sandboxed computing environment may be allowed to communicate with the untrusted network destination(s), but other communication from the host computer system (e.g., communications originating from outside the sandboxed computing environment such as from within the workspace or other memory spaces) to the untrusted network destination(s) may be prevented (e.g., or blocked).

The host computer system may include a host-based firewall. The host-based firewall may be configured to prevent unauthorized communication between applications and/or processes operating in the workspace of the host computer system and other devices on at least one network destination (e.g., the trusted LAN). The host-based firewall may be configured to block incoming communications to the workspace of the host computer system, except for predetermined trusted devices and/or predetermined network ports. The host-based firewall may be configured to determine whether the workspace is connected to a trusted or untrusted LAN and may apply different configurations depending on whether the workspace is communicating via the trusted LAN or the untrusted LAN. The host-based firewall may allow outgoing communications to be sent from a process in the workspace to a trusted LAN destination, for example, via a Virtual Private Network (VPN) client when connected to an untrusted LAN.

The browser process operating within the sandboxed computing environment may run in a separated and/or isolated memory space from the workspace of the host computer system. For example, one or more applications and/or processes (e.g., such as the browser process) operating within the sandboxed computing environment may be segregated to a sandbox memory space that is separated and/or isolated from a memory space configured to enable storage and/or operation of the workspace on the host computer system. The applications and/or processes operating within the sandboxed computing environment may not access any additional resources of the host computer system without an explicit user action. For example, the sandbox container process(es) may generate a command prompt that enables a user selection if an application and/or process operating within the sandboxed computing environment is requesting access to resources outside of the sandbox memory space. By prompting the user to confirm that the applications and/or processes operating within the sandboxed computing environment are permitted to access additional resources outside the sandbox memory space, malware that is designed to attempt to remain transparent to the user may be limited to operation within the sandboxed computing environment. Thus, the malware within the sandboxed computing environment may be unable to access other resources available to the host computing system, e.g., that may be connected local area networks and/or other memory regions.

Certain actions may be permitted by a sandbox-type firewall with approval by the user of the host computing system. For example, an application and/or process operating within a sandboxed computing environment may be allowed access to the host computing system to perform one or more of a cut or copy of data, a paste of data, a printing of data to a local printer, a file transfer, and/or the like. The host computer system may prevent one or more other transfers of data between the sandboxed computing environment and the workspace except those user initiated actions described herein. For example, the sandbox container process(es) may prevent unauthorized data transfers between the sandboxed computing environment and the workspace.

FIG. 1 illustrates an example of a host computer system that may implement one or more applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a sandbox container process(es). The sandbox container process(es) may segregate the workspace associated with the first memory space from the sandboxed computing environment associated with the second memory space. For example, the sandbox container process(es) may include a sandbox firewall. The sandbox firewall may enforce the segregation of the first and second memory spaces. If additional memory spaces are also segregated for other sandboxed computing environments (e.g., for other applications and/or processes), each memory space partition may be enforced using different respective firewall configurations implemented by the sandbox container process(es).

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between an application or a process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The sandbox container process(es) may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected browser may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the sandbox container process(es) may prevent the malware toolset from performing a reconnaissance of the host computer system to assess what data is available from the host computer system, such as computing resources, files, network information, additional network connectivity, etc. The sandbox firewall may prevent the data on the host computer system from being reported back to the remote device that sent the malware to the host computer and/or any other remote devices.

The sandbox container process(es) may prevent the malware toolset from determining user system privileges of the host computer system, which can be used to access data on any associated network or local area network. For example, applications and/or processes operating within the sandboxed computing environment may not have access and/or authorization to such host computer configurations.

The sandbox container process(es) may prevent the malware toolset from accessing local files stored on the host computer system. For example, the sandbox container process(es) may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process(es) may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process(es) may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access of other websites for denial of service attacks, and/or convert the infected host computer system into a source of malicious software from which toolsets or secondary payloads are downloaded to other, subsequently infected, host computer systems.

Use of a sandbox based computing environment to enforce internet isolation may offer several advantages as compared to other isolation techniques such as the use of virtual machines (VMs). For example, isolating a browser process or other applications and/or processes in a sandboxed computing environment rather than in a virtual machine may utilize less computing resources, which may improve the overall user experience. As an example, a virtual machine could be used to isolate a browser process; however, such an implementation would rely on access to a larger set of computing resources (e.g., more memory usage, more frequent processing usage, larger number of processes running overall, etc.) than a browser process operating in a sandboxed computing environment. The larger relative footprint of the virtual machine can draw resources away from other applications being implemented on the host computer system. By using a sandbox based Internet isolation technique, fewer resources may be used by the browser, allowing for a more seamless user experience for other applications. This may be magnified when more than one segregated and/or protected memory space is required.

In examples, a host computing system may configure to combine a sandbox based computing environment and a virtual machine (VM) environment (e.g., VM computing environment and/or micro-VM computing environment). For example, the computer systems may configure a VM computing environment to implement one or more applications (e.g., applications for monitoring keystrokes) and may configure a sandboxed based computing environment to one or more (e.g., other) applications (e.g., emails, word processors, and/or the like). The combination of the sandboxed and VM environment may provide a hybrid computing system. The host computing system may implement the VM environment to one or more applications that handle more sensitive information (e.g., keystrokes) and may provide better protection against malware (e.g., because the VM computing environment uses a separate virtual computing system and does not share on access to one or more host computing resources). The host computing system may implement the sandboxed environment to one or more other applications (e.g., all other applications that are not implementing the VM environment). The host computing system may preserve set of computing resources and may maintain the user experience. Thus, the combined computing system of the sandboxed computing environment and the VM environment may provide protections (e.g., better protections) against malware while not compromising the user experience.

Use of a sandboxed computing environment to enforce internet isolation on a trusted host computer of a trusted LAN may reduce traffic from the trusted LAN to the Internet. For example, the traffic from the trusted host computer to untrusted resources may bypass the trusted LAN via the sandboxed computing environment and a proxy server. Therefore, the total traffic monitored on the trusted LAN may be reduced due to the implementation of the sandboxed computing environment to enforce internet isolation.

Figure 2:
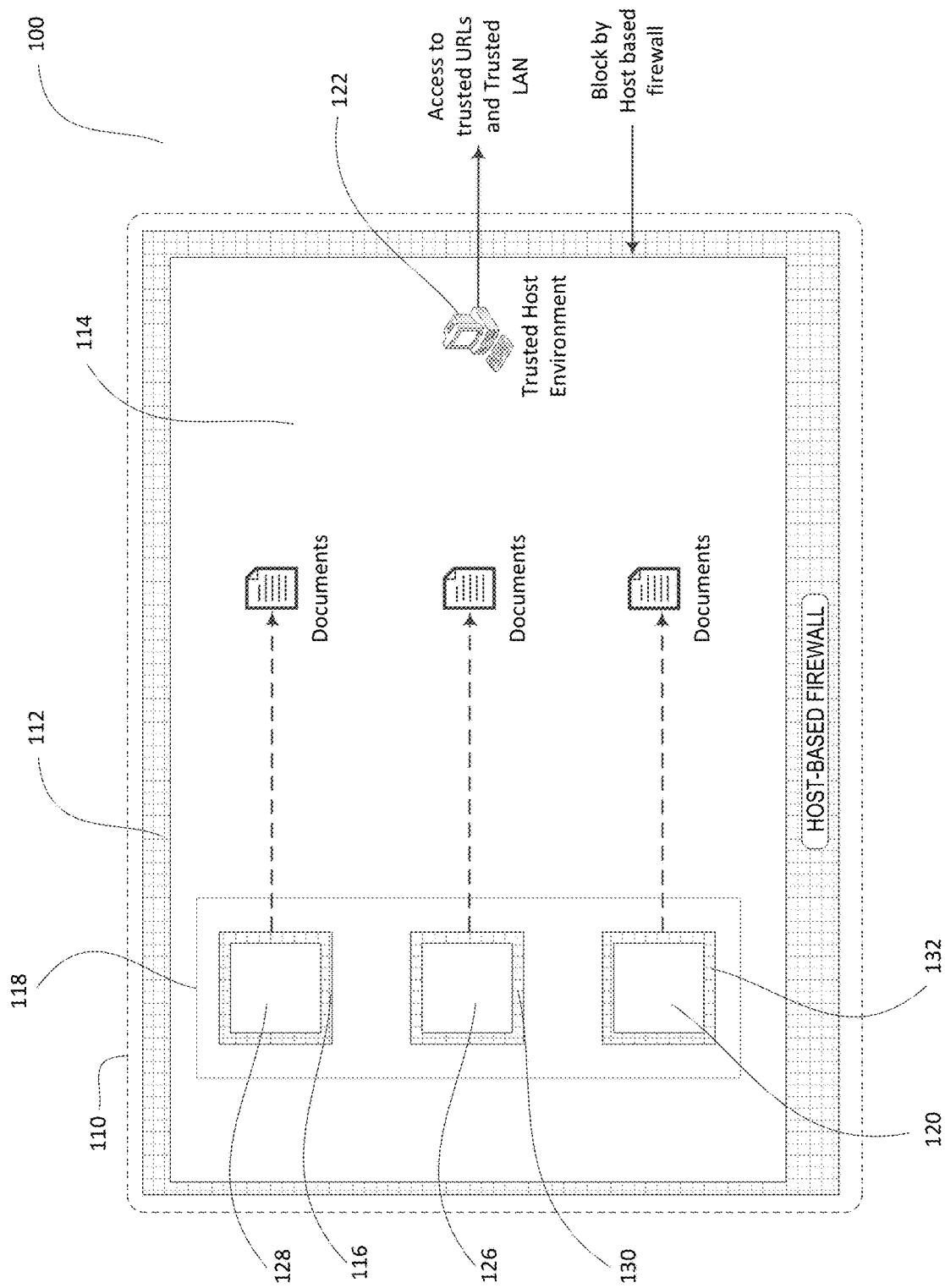
FIG. 2 depicts an example networked computer system having a host computer system using a sandbox based internet isolation system on a trusted local area network (LAN).

FIG. 2 depicts an example networked computer system 100 having a trusted host computer system 110 on a trusted local area network (LAN) (not shown). The trusted host computer system 110 may include one or more sandboxed computing environments (e.g., as shown by items 120, 126, and 128) or collectively shown as 118 (e.g., an internet isolation system). The collective sandboxed computing environment 118 may be considered an untrusted portion and/or untrusted memory space operating on the trusted host computer system 110. The collective sandboxed computing environment 118 may include one or more sandbox protected computing environments each containing one or more applications and/or processes. The one or more sandbox protected computing environments may have (e.g., may each have) a sandbox container process (e.g., sandbox firewall) as illustrated by 116 for sandboxed computing environment 128 (e.g., sandbox firewall 130 for sandboxed computing environment 126 and/or sandbox firewall 132 for sandboxed computing environment 120). The trusted LAN may be connected to the Internet.

The trusted host computer system 110 may include a host-based firewall 112, an operating system 122, the collective sandboxed computing environment 118, one or more sandboxed computing environments having (e.g., each having) a sandbox container process (e.g., sandbox firewall) as illustrated by 116, 130, and/or 132, and a workspace 114. The trusted host computer system 110 may be any host computer system, such as a personal computer (PC), a laptop, a virtual machine, a micro-virtual machine, and/or any of a variety of other host computer systems (e.g., mobile devices, internet of thing (IoT) devices, tablets, and/or the like) operatively connected with one or more user-accessible data entry devices, a display device viewable by a user, and a computer-accessible data storage. The trusted host computer system 110 may include an operating system 122 and one or more application programs that run on the operating system 122.

As an example, the trusted host computer system 110 may be a PC, with 4 GB RAM, and 146 GB hard disk computer-accessible storage, a monitor, a keyboard, and a mouse. The operating system 122 may be Windows-based, Linux-Based, Macintosh-based, and/or the like. The computer-accessible storage may store data corresponding to the software (e.g., computer-readable instructions) stored on the trusted host computer system 110 for common operation. Software programs may include word processing programs, accounting programs, remote connectivity programs, and/or other types of applications.

The one or more sandboxed computing environments (e.g., 120, 126, and/or 128) may include one or more resources (e.g., a limited set of resources) allocated to operate a sandbox container process(es). The one or more sandboxed computing environments (e.g., 120, 126, and/or 128), for example, may be (e.g., may each be) enforced via the one or more sandbox container process(es) (e.g., 132, 130, and/or 116, respectively). The sandbox container process(es) may (e.g., may each) be a security mechanism used to separate resources associated with each sandboxed computing environments, for example 120, 126, and/or 128, from other applications and/or processes that may be running in other memory spaces of the trusted host computer system 110, for example the workspace 114. A sandboxed computing environment, such as shown by 120, 126, and/or 128, may (e.g., may each) be configured to enable one or more applications and/or processes (e.g., such as a web browser, email, word processing, and/or the like) being executed within the collective sandboxed computing environment 118 to access the resources allocated for operation of the sandbox container process(es). The memory associated with a sandboxed computing environment, for example 126, may be separate from memory that is configured to enable storage and operation of the workspace 114 or any other memory spaces (e.g., other memory spaces associated with other sandboxed computing environments such as 120 and/or 128).

The workspace 114 may include one or more processes operating within the operating system 122. The operating system 122 of the host computer system may include a set of resources configured to enable operation of the workspace 114 and the collective sandboxed computing environment 118 and one or more associated applications and/or process(es).

The trusted host computer system 110 may enable, as an example, a first memory space configured to enable storage and/or operation of a workspace 114 configured to execute a first set of one or more applications and/or processes running on an operating system of the host computer system. The workspace 114 may be configured to enable user interaction with the applications and processes running on the operating system 122. In an example, the workspace 114 may be used to operate one or more local applications (e.g., applications that do not access the Internet or infrequently access the Internet) and/or applications deemed to present a relatively small risk of infection from malware.

A second memory space may be configured to enable storage and/or operation of a second set of one or more applications and/or processes. The second memory space may be associated with a first sandboxed computing environment, for example 128 configured to run on the operating system 122. The first sandboxed computing environment (or collective sandboxed computing environment 118) may be configured to access a portion of the operating system 122 resources (e.g., a different portion than the first memory space associated with the workspace of the host computing system 110) and may be disallowed from accessing other operating system 122 resources. For example, a second set of one or more applications and/or processes executed in the second memory space may include a browser process and/or other process related to browsing the Internet.

A third memory space may be configured to enable storage and/or operation of a third set of one or more applications and/or processes. The third memory space may be associated with a second sandboxed computing environment, for example 126, configured to run on the operating system 122. The second sandboxed computing environment 126 may be configured to access a portion of the operating system 122 resources (e.g., a different portion than the first memory space and/or the second memory space) and may be disallowed from accessing other operating system 122 resources. For example, a third set of one or more applications and/or processes executed in the third memory space may include an email process and/or other processes related to accessing an email system.

Additional memory regions and sandboxed memory spaces may also be implemented for other applications and/or processes. For example, word processing application, file sharing applications, remote desktop applications, video chat applications, system utilities, and/or the like that may be configured to operate within separate memory spaces(s) associated with additional sandboxed computing environment(s) 120 and/or the like. The types of applications implemented in each sandboxed computing environment, which applications may share a common sandboxed computing environment, and/or the number of sandboxed computing environments may depend on the system configuration. The sandbox memory spaces may be enabled on the host computer system 110 as described herein. Separation and/or isolation of computer resources and/or memory space may be referred to as a virtual air gapped solution. Each memory space may be separate physical memory locations. One or more of the memory spaces may be collocated on a physical memory.

The trusted host computer system 110 may enable the host-based firewall 112. The host-based firewall 112 may prohibit communication (e.g., direct communication) between the trusted host computer system 110 and other devices on the trusted LAN. The host-based firewall 112 may prohibit communication (e.g., direct communication) between the trusted host computer system 110 and other devices within the networked computer system 100. For example, the host-based firewall 112 may be configured to block incoming traffic to the trusted host computer system 110, except for traffic received via one or more predetermined devices and/or ports. One or more devices (e.g., predetermined devices) on the networked computer system 100 or the trusted LAN may bypass the host-based firewall 112, for example, using a predetermined set of protocols and/or ports.

The host-based firewall 112 may be implemented using software and/or hardware. For example, the host-based firewall 112 may be implemented using software that is commercially available, for example, such as Symantec Endpoint Protection, MacAfee Host Based Security Systems, etc. The host-based firewall 112 may be implemented using software inherent in the operating system 122 of the trusted host computer system 110, for example the Windows operating system firewall. The host-based firewall 112 may be implemented using software for configuring and/or implementing restrictive ingress and/or egress policies on the trusted host computer system 110.

One or more processes operating within the collective sandboxed computing environment 118 may be prohibited from communicating with other resources within the networked computer system 100. A browser process operating in the sandboxed computing environment 120 (e.g., a sandboxed browser) may run within the collective sandboxed computing environment 118. The sandboxed computing environment 120 that is associated with the web browser process may be configured to enable access to untrusted network destinations.

Browser solutions running within the workspace 114 of the trusted host computer system 110 may be utilized for communication between the trusted host computer system 110 and trusted network destinations. For example, browser processes running within the workspace 114 of the trusted host computer system 110 may enable access to the trusted network destinations.

One or more sandboxed computing environments, for example 120, 126, and/or 128, of the collective sandboxed computing environment 118 and/or each sandbox container process(es) (e.g., 132, 130, and/or 116, respectively) may be implemented using software and/or hardware. For example, one or more (e.g., each of the) sandboxed computing environments, for example 120, 126, and/or 128, of the collective sandboxed computing environment 118 and/or one or more corresponding sandbox container process(es) (e.g., 132, 130, and/or 116, respectively) may be implemented using any combination of software that is commercially available, for example, such as Invincea Endpoint Protection, Tanium Endpoint Platform, Bromium Advanced Endpoint Security, and/or the like.

One or more sandboxed computing environments (e.g., as shown by 120, 126, and/or 128) may include one or more resources (e.g., a limited set of resources) allocated to operate a sandbox container process(es) (e.g., 132, 130, and/or 116, respectively). The one or more sandboxed computing environments (e.g., 120, 126, and/or 128) may be (e.g., may each be) enforced via the sandbox container process(es) (e.g., 132, 130, and/or 116, respectively). The sandbox container process(es) may (e.g., may each) be a security mechanism used to separate resources associated with each sandboxed computing environments, for example 128 from other applications and/or processes that may be running in other memory spaces, for example 120, 126, and/or the workspace 114. In examples, a single sandbox container process or a group of sandbox container processes may enforce the partitioning of the memory spaces associated with sandboxed computing environments (e.g., 120, 126, and/or 128), for example by applying a respective sandbox firewall policy for each of the sandboxed computing environments (e.g., 120, 126, and/or 128).

A sandboxed computing environment, such as 120, 126, and/or 128, may (e.g., may each) be configured to enable one or more applications and/or processes. For example, the sandbox container process(es) may enable a sandbox firewall, such as 116. The sandbox firewall 116, as an example, may enforce a separation of the memory space associated with its sandboxed computing environment 128 and one or more (e.g., all) other memory spaces (e.g., memory spaces associated with other sandboxed computing environments, for example 120 and/or 126, and/or the workspace 114). For example, the sandbox firewall 116 may allow a predefined set of processes to be executed within the sandboxed computing environment 128. The sandbox firewall 116, as an example, may prevent execution, in the sandboxed computing environment 128, of any processes outside of the predefined set of processes. The memory space associated with the sandboxed computing environment 128, as an example, may be referred to as a separate and/or isolated memory space. The sandbox container process(es) associated with the sandboxed computing environment 128 may be configured to segregate to the memory space, any additional processes, and/or memory usage required for usage of untrusted network destination related content during an established communication session. Separation and/or isolation of computer resources may be referred to as a virtual air gapped solution. Each memory space may be separate physical memory locations. One or more of the memory spaces may be collocated on a physical memory.

Data transfers between each sandboxed computing environment such as shown by 120, 126, and/or 128 and other memory spaces of the trusted host computer system 110 may be restricted to set transfer types. The set transfer types may be configured to minimize the possibility of malicious data migrating between memory spaces of the trusted host computer system 110. A collective sandboxed computing environment 118 may transfer (e.g., only transfer) data to or from other memory spaces of the trusted host computer system 110, for example the workspace 114 in response to a user input directing the data transfer. Further, a sandboxed computing environment, for example 120, may transfer (e.g., only transfer) data to or from another sandboxed computing environment, for example 126 and/or 128, in response to a user input (e.g., explicit user input) directing the data transfer. The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

In an example, applications and/or processes being executed in one or more sandboxed container environment(s) may not be permitted any type of direct communication and/or data transfer into one or more other sandbox container environments. Rather, to send data from a first sandbox container environment to a second sandbox container environment, the data may first need to be sent from the first sandboxed computing environment to the workspace via a first transfer, then from the workspace to the second sandboxed computing environment via a second transfer. Some types of sandboxed computing environments may be disallowed from receiving data from other sandboxed computing environments and/or from receiving data from the workspace (e.g., enforced via respective sandbox firewall(s)). For example, the corresponding sandboxed firewall may block data from workspace (e.g., and/or other sandboxed computing environment) if a set of criteria associated with the corresponding sandboxed firewall has not been met. Transfers from a sandboxed computing environment to the workspace and/or another sandboxed computing environment may be limited to a predetermined set of transfer types. Transfers from a sandboxed computing environment to the workspace 114 and/or another sandboxed computing environment may require an explicit user input to be initiated.

The operating system 122 may access (e.g., only access) the collective sandboxed computing environment 118 as required for the proper operation of each sandboxed computing environment (e.g., 120, 126, and/or 128). The sandbox firewall 116, for example may be built-in with the sandboxed computing environment 128.

A user may initiate a browser process, an email process, and/or other application processes (e.g., word processing) and may enter and/or select a network destination. The trusted host computer system 110 may initiate the one or more processes described herein (e.g., browser process, email process, and/or one or more other application processes) in the workspace 114 or a sandboxed computing environment, such as shown by 120, 126, and/or 128. The trusted host computer system 110 may determine whether the network destination is trusted or untrusted. The trusted host computer system 110 may provide access to a trusted network destination via the one or more processes executed in the workspace 114. The trusted host computer system 110 may provide access to an untrusted network destination via one or more of the sandboxed computing environments, such as 120, 126, and/or 128. A sandbox container process(es) (e.g., 132, 130, and/or 116, respectively) may be configured to spawn an application process within the correct environment based on the network destination classification, for example trusted or untrusted.

As an example, a sandbox container process (e.g., 132) may determine that a browser process operating in the workspace 114 is attempting to access an untrusted network destination. A sandbox container process 132 may spawn an instance of a sandboxed browser process in the sandboxed computing environment 120 to provide access to the untrusted network destination. As an example, a sandbox container process (e.g., 132) may determine that the browser process operating in the workspace 114 is attempting to access a trusted network destination. The sandbox container process (e.g., 132) may allow the browser process operating in the workspace 114 to access the trusted network destination.

As another example, the sandbox container process 132 may determine that the sandboxed browser process operating in the sandboxed computing environment 120 is attempting to access an untrusted network destination. The sandbox container process 132 may allow the sandboxed browser process operating in the sandboxed computing environment 120 to access the untrusted network destination. As another example, the sandbox container process 132 may determine that the sandboxed browser process operating in the sandboxed computing environment 120 is attempting to access a trusted network destination. The sandbox container process may spawn an instance of a browser process in the workspace 114 to provide access to the trusted network destination.

As an example, a sandbox container process 130 may determine that the sandboxed email process operating in the sandboxed computing environment 126 is attempting to access the sandboxed browser process operating in the sandboxes computing environment 120. This may occur when a user receives an email in a sandboxed computing environment 126 and clicks a link to a website included in the email. The sandbox container process 130 may be configured to prevent communication (e.g., direct communication) between the two processes, e.g., between the sandboxed browser process running in sandboxed computing environment 120 and the sandboxed email process running in the sandboxed computing environment 126. A sandbox firewall associated with either or both sandboxed computing environments, for example 132 and 130 respectively, may be configured to prevent such communication. For example, each sandbox firewall may prevent such communication if a set of criteria associated with each sandbox firewall has not been satisfied. If one or more sandboxed container processes prevent direct communication between one or more sandboxed applications/processes and applications/processes operating in other memory spaces, the sandboxed computing environment may be protected (e.g., further protected) from malware. In case of a malware intrusion within a sandboxed computing environment, the infected container (e.g., only the infected container) may be restored to a malware-free version (e.g., pristine copy) instead of restoring one or more (e.g., all) sandboxed computing environments.

In an example, one or more sandbox container process(es) may be configured to allow communication (e.g., direct communication) between one or more other sandbox container environments (e.g., via a conduit between the container processes) and/or the workspace 114, which will be described herein.

In another example, the sandbox container process(es) may be configured to have a firewall for one or more (e.g., all) of the sandbox container environments. The firewall may be configured to implement a set of criteria (e.g., rules, policies, and/or protocols) for each individual sandbox container and/or a group of sandbox containers, which will also be described herein.

A sandboxed computing environment, such as shown by 120, 126 and/or 128 may receive malware from an untrusted network device. For example, the sandboxed computing environment (e.g., 120, 126, and/or 128) may communicate with the untrusted network device on the Internet (e.g., via a proxy/web-content filter and/or other intermediate device). The untrusted network device may send malware (e.g., malicious software) to the sandboxed computing environment (e.g., 120, 126, and/or 128). The malware may be executed within the sandboxed computing environment (e.g., 120, 126, and/or 128). The executed malware may start one or more processes, download one or more payloads, and/or execute the one or more payloads. The processes and/or payloads may be executed within the sandboxed computing environment (e.g., 120, 126, and/or 128), for example, instead of on the workspace 114 of the operating system 122. When the sandboxed computing environment (e.g., 120, 126, and/or 128) has received malware, the sandboxed computing environment (e.g., 120, 126, and/or 128) may be considered infected.

Even when the sandboxed computing environment (e.g., 120, 126, and/or 128) is infected, the use of the sandbox based Internet isolation may allow the trusted host computer system 110 to be considered to be uninfected and trusted. The trusted host computer system 110 may be considered uninfected and trusted because the memory space of the sandboxed computing environment (e.g., 120, 126, and/or 128) and the processes operating therein may be separated and isolated from the memory space for the workspace 114 (e.g., the first memory space) of the trusted host computer system 110. The introduced malware may not be able to access the resources, assets, and/or files of the operating system 122 or any other memory space of the host computing device 110. For example, the sandbox firewall 116 may prevent the introduced malware from accessing the resources, assets, and/or files of the operating system 122. The trusted LAN (e.g., to which the trusted host computer system 110 is connected) may be deemed to be uninfected and trusted, for example, because the trusted host computer system 110 is considered trusted and uninfected.

A sandboxed computing environment (e.g., 120, 126, and/or 128) that becomes infected and/or untrusted may encounter problems. The sandbox container process(es) associated with the infected sandboxed computing environment may become inoperable, for example, due to the introduced malware. An infected sandboxed computing environment may restore a pristine copy (e.g., a "clean slate") of the sandboxed computing environment(s) (e.g., 120, 126, and/or 128), its associated sandbox container process(es) (e.g., 132, 130, and/or 116, respectively), and/or its separated and isolated memory space. An infected sandboxed computing environment may be cleared (e.g., cleared immediately) and reverted to its original, trusted condition. For example, one or more (e.g., all) aspects of the introduced malware may be removed from the sandboxed computing environment (e.g., 120, 126, and/or 128) without any harm to the operating system 122. The sandboxed computing environment may have a clean slate initiated periodically, e.g., once a day, once every 12 hours, once an hour, etc. The sandboxed computing environment may have a clean slate initiated on demand, e.g., based on an indication and/or input received from the user of the trusted host computer system 110. The clean slate may be initiated using a restore capability of the sandbox computer environment.

For example, the workspace 114 of the trusted host computer system 110 may include at least one host monitoring process. The at least on host monitoring process may be configured to monitor the collective sandboxed computing environment 118 and/or each sandbox container environment (e.g., 120, 126, and/or 128). The at least one host monitoring process may be configured to restore a sandboxed computing environment to a known good version.

The at least one host monitoring process may be configured to restore a sandboxed computing environment based on one or more of a user input, an application input, detection of an abnormality in a sandbox container process(es), or expiration of predetermined period of time (e.g., a timer-based refresh mechanism).

The trusted host computer system 110 may be configured to store a restore point of the collective sandboxed computing environment 118 and/or each sandboxed computing environment (e.g., 120, 126, and/or 128). The restore point may be associated with a configuration of the collective sandboxed computing environment 118 and/or each sandboxed computing environment (e.g., 120, 126, and/or 128). The trusted host computer system 110 (e.g., an application or process operating within the workspace 114) may detect anomalous behavior within the collective sandboxed computing environment 118 and/or each sandboxed computing environment (e.g., 120, 126, and/or 128). The trusted host computer system 110 may restore the collective sandboxed computing environment 118 and/or each sandbox container environment (e.g., 120, 126, and/or 128) to the restore point, for example, based on detection of the anomalous behavior.

If malware on an infected sandboxed computing environment is able to access the resources, assets, and/or files of the operating system 122, the trusted host computer system 110 may be considered infected and untrusted. For example, the malware may bypass the sandbox firewall 116, for example via explicit user input. In an example, the other host computer systems connected to the trusted LAN may also be utilizing similar security and/or isolation systems as is described with respect to the trusted host computer system 110. Even if one of the computers on the trusted LAN is infected and transmits malware on the LAN, the host-based firewall 112 configured on the other devices connected to the trusted LAN may prohibit the introduced malware from communicating with/being passed to these other devices on the trusted LAN. For example, the host-based firewall 112 may be configured to block incoming traffic from the trusted LAN, except for traffic from predetermined devices on predetermined network ports. For example, the host-based firewall 112 may allow the trusted host computer system 110 to send outgoing messages on the trusted LAN (e.g., in order to reach certain trusted network locations), but the host-based firewall 112 may be configured to block incoming communications from the other devices connected to the trusted LAN, except for traffic from predetermined devices on predetermined network ports. Thus, when an untrusted host computer system is connected to the trusted LAN, the trusted LAN may remain uninfected and trusted even when other devices on the trusted LAN become infected.

Malware may be introduced to the operating system 122 from a source other than communication with the Internet. For example, malware may be introduced to the operating system 122 via an infected email, an infected USB memory stick, and/or another infected hardware device.

An infected and/or untrusted host computer system (e.g., regardless of the introduced malware's vector) may have no communication (e.g., direct communication) with the Internet. For example, one or more sandbox container processes (e.g., or one or more sandbox firewalls) may be configured to prevent the processes and applications in the workspace 114 from being allowed to access sandboxed computing environment resources, applications, and/or processes, which may prevent malware introduced into the workspace 114 from communicating with its source or other devices (e.g., via the Internet and/or on the Internet). Without a connection to (e.g., communication with) the Internet, the introduced malware may be prevented from performing many toolset functions from within the workspace 114 as described herein or any other function that an enslaved, infected and/or untrusted host computer system may perform. Without a connection to the Internet, the introduced malware may not be able to transfer any data from the infected and/or untrusted host computer system (e.g., the workspace 114) to the Internet.

Malware may attempt to circumvent implemented host-based security protections. For example, the introduced malware may attempt to tamper with processes that are critical to the functioning of the host-based security protections. The networked computer system 100 may monitor the host-based security protections for tampering (e.g., by way of secondary processes or security applications). The networked computer system 100 may determine that one or more host-based security protection related processes have been tampered with, are missing, have stopped, and/or have been otherwise altered. Host-based security protection related processes may include processes associated with the host-based firewall 112 and/or a sandboxed computing environment, as shown by the collective sandboxed computing environment 118 running on the operating system 122. The networked computer system 100 may initiate unaltered versions of the tampered, missing, stopped, and/or otherwise altered host-based security protection related processes.

The networked computer system 100 may monitor for any exceptions to normal and trusted operations of the trusted host computer system 110. The networked computer system 100 may send an alert message to a central monitoring security system. The alert message may indicate that one or more security protection related processes were restarted (e.g., automatically restarted). The alert message may include such details as required for the proper detection and remediation of the introduced malware.

The networked computer system 100 may detect an introduced malware's blocked attempt(s) to communicate with the Internet. For example, the networked computer system 100 may detect one or more blocked toolset functions and/or exceptions described herein, or any other blocked functions that an enslaved, infected host computer system may perform. An alert message that indicates the detected blocked communication attempt(s) may be sent to the central monitoring security system. For example, the device on the networked computer system 100 that detects the blocked communication attempt(s) may send the alert message to the central monitoring security system.

The networked computer system 100 may detect blocked communication attempts and/or exceptions using one or more of an event log from the trusted host computer system 110, another firewall device within the networked computer system 100, an intrusion detection monitoring device within the networked computer system 100, a user authentication server within the networked computer system 100, or the like.

When an infected and/or untrusted host computer system connected to the trusted LAN is detected, the trusted LAN may perform remediation. Remediation may include one or more of removal of the infected and/or untrusted host computer system from the trusted LAN, analysis of the infected and/or untrusted host computer system, removal of the introduced malware from the infected and/or untrusted host computer system, rebuilding of the infected and/or untrusted host computer system to a trusted configuration, and/or replacing the infected and/or untrusted host computer system with another trusted host computer system (e.g., such as the trusted host computer system 110).

The trusted host computer system 110 and/or the trusted LAN may limit the adverse effects of received malware. For example, the trusted host computer system 110 and/or the trusted LAN may prevent the received malware from using its vector to communicate data from the trusted host computer system 110.

An author of the malware may not be aware of any level of efficacy of the introduced malware, its successful attack vector, and/or any data of an infected host computer system that may have been compromised or collected, for example, because the networked computer system 100 may prevent communication between an infected and/or untrusted host computer system and the Internet (not shown).

An electronic mail (email) may be exchanged between the trusted host computer system 110 and the Internet. For example, the networked computer system 100 may include an intermediary email device (e.g., an email server, an email proxy, and/or the like). The email may be sent and/or received by the trusted host computer system 110 using an email application running on the operating system 122. The intermediary email device (not shown) may be located within the trusted LAN. The intermediary email device may be located outside of the trusted LAN.

The exchange of email between the trusted host computer system 110 and the Internet may be accomplished through a web browser application, for example, when the intermediary email device is not included in the networked computer system 100. The exchange of email may be accomplished via a sandboxed computing environment 126 (e.g., as described herein using the sandboxed email process operating in the sandboxed computing environment 126 and/or a sandboxed web process operating in the sandboxed computing environment 120.

The protection controls described herein (e.g., the host-based firewall 112 and/or the sandboxed computing environments 120 and 126) may protect the trusted host computer system 110 from malware as described herein.

One or more files may be exchanged between the trusted host computer system 110 and untrusted network destinations, for example devices on the Internet. The files may be exchanged using an intermediary secure transfer device (e.g., a transfer server, a transfer appliance, and/or the like). The intermediary secure transfer device may be located in the networked. computer system 100, for example, connected to a border firewall. The intermediary secure transfer device may be located within the trusted LAN.

The trusted host computer system 110 may exchange files with an untrusted network destination, for example a device on the Internet. The files may be transferred from the trusted host computer system 110 and/or an untrusted network destination to the intermediary secure transfer device. A file transfer may be initiated from the trusted host computer system 110 and/or from the device on the Internet. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP), or Hyper Text Transfer Protocol Secure (HTTP). Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the trusted host computer system 110 to the intermediary secure transfer device.

The files received from the trusted host computer system 110 may be transferred from the intermediary secure transfer device to an untrusted network device, for example a device on the Internet. The file transfer may be initiated from the device on the Internet. The file transfer may utilize an encrypted protocol via a predetermined network port. Authenticity of the device on the Internet may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate the authenticity of the device on the Internet. Other encrypted protocol(s), network port(s), and/or authentication combination(s) may be employed for data transfers from the intermediary secure transfer device to a device on the Internet.

The files received from the untrusted device may be transferred from the intermediary secure transfer device to the trusted host computer system 110. The file transfer may be initiated from the host computing device 110. The file transfer may utilize an encrypted protocol via a predetermined network port. Authenticity of the device on the Internet may be validated, for example, prior to any data transfer.

Figure 3:
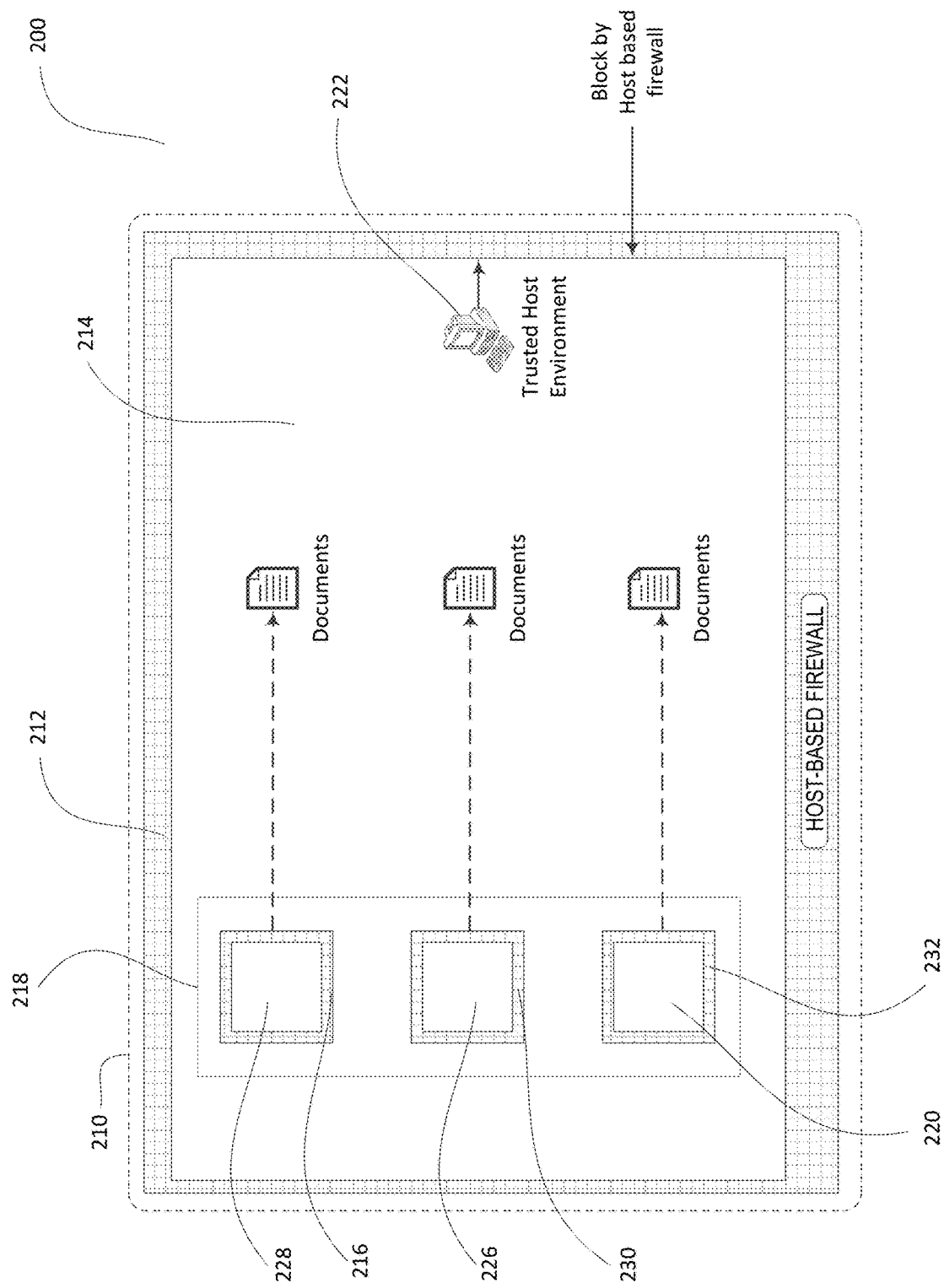
FIG. 3 depicts an example networked computer system having a host computer system using a sandbox based internet isolation system on an untrusted LAN.

FIG. 3 depicts an example trusted host computer system 210 connected to an untrusted LAN (not shown). The trusted host computer system 210 may include an operating system 222 and one or more sandboxed computing environments (e.g., as shown by items 220, 226, and/or 228) or collectively shown as 218 (e.g., an internet isolation system) that is configured to be executed on a restricted or isolated portion of the operating system 222. The collective sandboxed computing environment 218 may be considered an untrusted portion and/or untrusted memory space operating on the trusted host computer system 210. The collective sandboxed computing environment 218 may include one or more sandboxed computing environments each containing one or more applications and/or processes. The one or more sandboxed computing environments may have (e.g., may each have) a sandbox container process (e.g., sandbox firewall) as illustrated by 216 for sandboxed computing environment 228 (e.g., sandbox firewall 230 for sandboxed computing environment 226 and/or sandbox firewall 232 for sandboxed computing environment 220).

The trusted host computer system 210 may include a host-based firewall 212, an operating system 222, the collective sandboxed computing environment 218, one or more sandboxed computing environments having (e.g., each having) a sandbox container process (e.g., sandbox firewall) as illustrated by 216, 230, and/or 232, and a workspace 214. The trusted host computer system 210 may be any host computer system, such as a personal computer (PC), a laptop, a virtual machine, a micro-virtual machine, and/or any of a variety of other host computer systems (e.g., mobile devices, internet of thing (IoT) devices, tablets, and/or the like) operatively connected with one or more user-accessible data entry devices, a display device viewable by a user, and a computer-accessible data storage. The trusted host computer system 210 may include an operating system 222 and one or more application programs that run on the operating system 222.

As an example, the trusted host computer system 210 may be a PC, with 4 GB RAM and 146 GB hard disk computer-accessible storage, a monitor, a keyboard, and a mouse. The operating system 222 may be Windows-based, Linux-Based, Macintosh-based, and/or the like. The computer-accessible storage may store data corresponding to the software (e.g., computer-readable instructions) stored on the trusted host computer system 210 for common operation. Software programs may include word processing programs, accounting programs, remote connectivity programs, and/or other types of applications.

The one or more sandboxed computing environments (e.g., 228, 226, and/or 220) may include one or more resources (e.g., a limited set of resources) allocated to operation of a sandbox container process(es). The one or more sandboxed computing environments (e.g., 228, 226, and/or 220), for example, may be (e.g., may each be) enforced via the one or more sandbox container process(es) (e.g., 216, 230, and/or 232, respectively). The sandbox container process(es) may (e.g., may each be) be a security mechanism used to separate resources associated with each sandboxed computing environments, (e.g., 228, 226, and/or 220), from other applications and/or processes that may be running in other memory spaces of the trusted host computer system 210, for example the workspace 214. A sandboxed computing environment (e.g., 228, 226, and/or 220) may be (e.g., may each be) configured to enable one or more applications and/or processes (e.g., such as a web browser, email, word processing, and/or the like) being executed within the collective sandboxed computing environment 218 to access the resources allocated for operation of the sandbox container process(es). The memory associated with the sandboxed computing environment, for example 226, may be separate from memory that is configured to enable storage and operation of the workspace 214 or any other memory spaces (e.g., other memory spaces associated with other sandboxed computing environments such as 228 and/or 220).

The workspace 214 may include one or more processes operating within the operating system 222. The operating system 222 of the host computer system may include a set of resources configured to enable operation of the workspace 214 and the collective sandboxed computing environment 218 and one or more associated applications and/or process(es).

The trusted host computer system 210 may enable, as an example, a first memory space configured to enable storage and/or operation of a workspace 214 configured to execute a first set of one or more applications and/or processes running on an operating system of the host computer system. The workspace 214 may be configured to enable user interaction with the applications and processes running on the operating system 222. In an example, the workspace 214 may be used to operate one or more local applications (e.g., applications that do not access the Internet or infrequently access the Internet) and/or applications deemed to present a relatively small risk of infection from malware.

A second memory space may be configured to enable storage and/or operation of a second set of one or more applications and/or processes. The second memory space may be associated with a first sandboxed computing environment, for example 220 configured to run on the operating system 222. The first sandboxed computing environment (or collective computing environment 218) may be configured to access a portion of the operating system 222 resources (e.g., a different portion than the first memory space associated with workspace of the host computing system 210) and may be disallowed from accessing other operating system 222 resources. For example, a second set of one or more applications and/or processes executed in the second memory space may include a browser process and/or other process related to browsing the Internet.

A third memory space may be configured to enable storage and/or operation of a third set of one or more applications and/or processes. The third memory space may be associated with a second sandboxed computing environment, for example 226, configured to run on the operating system 222. The second sandboxed computing environment 226 may be configured to access a portion of the operating system 222 resources (e.g., a different portion than the first memory space and/or the second memory space) and may be disallowed from accessing other operating system 222 resources. For example, a third set of one or more applications and/or processes executed in the third memory space may include an email process and/or other processes related to accessing an email system.

Additional memory regions and sandboxed memory spaces may also be implemented for other applications and/or processes. For example, word processing application, file sharing applications, remote desktop applications, video chat applications, system utilities, and/or the like that may be configured to operate within separate memory spaces(s) associated with additional sandboxed computing environment(s) 228 and/or the like. The types of applications implemented in each sandboxed computing environment, which applications may share a common sandboxed computing environment, and/or the number of sandboxed computing environments may depend on the system configuration. The sandbox memory spaces may be enabled on the host computer system 210 as described herein. Separation and/or isolation of computer resources and/or memory space may be referred to as a virtual air gapped solution. Each memory space may be separate physical memory locations. One or more of the memory spaces may be collocated on a physical memory.

The trusted host computer system 210 may enable the host-based firewall 212. The host-based firewall 212 may prohibit communication (e.g., direct communication) between the trusted host computer system 210 and other devices on the untrusted LAN. The host-based firewall 212 may prohibit communication (e.g., direct communication) between the trusted host computer system 210 and other devices within the networked computer system 200. For example, the host-based firewall 212 may be configured to block one or more (e.g., all) traffic incoming to and/or outgoing from the trusted host computer system 210.

The host-based firewall 212 may be implemented using software and/or hardware. For example, the host-based firewall 212 may be implemented using software that is commercially available, for example, such as Symantec Endpoint Protection, MacAfee Host Based Security Systems, etc. The host-based firewall 212 may be implemented using software inherent in the operating system 222 of the trusted host computer system 210, for example the Windows operating system firewall. The host-based firewall 212 may be implemented using software for configuring and/or implementing restrictive ingress and/or egress policies on the trusted host computer system 210. Such commercial implementations may be configured to implement a set of criteria (e.g., set of rules) that prevent communications other than those associated with the sandbox browser program 220 and/or certain preauthorized application (e.g., VPN client) using predetermined protocols and resources (e.g., predetermined ports and procedures) from communicating via the untrusted LAN.

The trusted host computer system 210 may support a VPN client (not shown). The VPN client may operate within the operating system 222 of the trusted host computer system 210. The VPN client may create a secure and/or encrypted communication path through the untrusted LAN and the Internet to a trusted LAN (not shown).

The VPN client may be implemented using software and/or hardware. For example, the VPN client may be implemented using software that is commercially available, for example, such as CheckPoint Mobile, NordVPN, and/or Cisco VPN client. The VPN may be programmed to use a specific communication pattern and/or specific communication resources when establishing the VPN connection with the trusted LAN. The host-based firewall 212 may prevent the VPN client (or any other applications running outside of the collective sandboxed computing environment 218) from communicating via the untrusted LAN unless the specific communication pattern and/or specific communication resources are used for performing such communications.

One or more processes operating within the collective sandboxed computing environment 218 may be prohibited from communicating with other resources within the networked computer system 200. A browser process operating in the sandboxed computing environment 220 (e.g., a sandboxed browser) may run within the collective sandboxed computing environment 218. The sandboxed computing environment 220 that is associated with the web browser process and/or the host based firewall 212 may be configured to enable access to untrusted network destinations.

Browser solutions running within the workspace 214 of the trusted host computer system 210 may be utilized for communication between the trusted host computer system 210 and trusted network destinations. For example, browser processes running within the workspace 214 of the trusted host computer system 210 may enable access to the trusted network destinations via a VPN client. One or more processes or applications within the workspace may be allowed to access a trusted destination provided a predetermined protocol (e.g., a VPN, communication using a set protocol on a set communication port, and/or the like) is used. In an example, a process or application in the workspace may be blocked from accessing a trusted destination if a predetermined communication protocol is not followed. In another example, the one or more applications or processes in the workspace may be allowed to access a trusted destination without having to utilize a predetermined protocol.

One or more sandboxed computing environments, for example 228, 226, and/or 220, of the collective sandboxed computing environment 218 and/or the sandbox container process(es) (e.g., 216, 230, and/or 232, respectively) may be implemented using software and/or hardware. For example, one or more (e.g., each of the) the sandboxed computing environments (e.g., 228, 226, and/or 220) of the collective sandboxed computing environment 218 and/or the corresponding sandbox container process(es) (e.g., 216, 230, and/or 232, respectively) may be implemented using software that is commercially available, for example, such as Invincea Endpoint Protection, Tanium Endpoint Platform, Bromium Advanced Endpoint Security, and/or the like.

The one or more sandboxed computing environments (e.g., as shown by 228, 226, and/or 220) may include one or more resources (e.g., a limited set of resources) allocated to operate a sandbox container process(es) (e.g., 216, 230, and/or 232, respectively). The one or more sandboxed computing environments (e.g., 228, 226, and/or 220) may be (e.g., may each be) enforced via the sandbox container process(es) (e.g., 216, 230, and/or 232, respectively). The sandbox container process(es) may (e.g., may each) be a security mechanism used to separate resources associated with each sandboxed computing environments, for example 228 from other applications and/or processes that may be running in other memory spaces, for example, 226, 220, and/or the workspace 214. In examples, a single sandbox container process or a group of sandbox container processes may enforce the partitioning of the memory spaces associated with sandboxed computing environments (e.g., 220, 226, and/or 228), for example by applying a respective sandbox firewall policy for each of the sandboxed computing environments (e.g., 220, 226, and/or 228).

A sandboxed computing environment, such as 228, 226, and/or 220, may (e.g., may each) be configured to enable one or more applications and/or processes. For example, the sandbox container process(es) may enable the sandbox firewall, such as 216. The sandbox firewall 216, as an example, may enforce a separation of the memory spaces associated with its sandboxed computing environment 228 and one or more (e.g., all) other memory spaces (e.g., memory spaces associated with other sandboxed computing environments, for example 220 and/or 226, and/or the workspace 214). For example, the sandbox firewall 216 may allow a predefined set of processes to be executed within the sandboxed computing environment 228. The sandbox firewall 216, as an example, may prevent execution, in the sandboxed computing environment 228, of any processes outside of the predefined set of processes. The memory space associated with the sandboxed computing environment 228 may be referred to as a separate and/or isolated memory space. The sandbox container process(es) associated with the sandboxed computing environment 228 may be configured to segregate to the memory space, any additional processes, and/or memory usage required for usage of untrusted network destination related content during an established communication session. Separation and/or isolation of computer resources may be referred to as a virtual air gapped solution. Each memory space may be separate physical memory locations. One or more of the memory spaces may be collocated on a physical memory.

Data transfers between each sandboxed computing environment, such as shown by 220, 226, and/or 228, and other memory spaces of the trusted host computer system 210 may be restricted to set transfer types. The set transfer types may be configured to minimize the possibility of malicious data migrating between memory spaces of the trusted host computer system 210. A collective sandboxed computing environment 218 may transfer (e.g., only transfer) data to or from other memory spaces of the trusted host computer system 210, for example the workspace 214 in response to a user input directing the data transfer. Further, a sandboxed computing environment, for example 220, may transfer (e.g., only transfer) data to or from another sandboxed computing environment, for example 226 and/or 228, in response to a user input directing the data transfer. The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

In an example, applications and/or processes being executed in one or more sandboxed container environment(s) may not be permitted any type of direct communication and/or data transfer into one or more other sandbox container environments. Rather, to send data from a first sandbox container environment to a second sandbox container environment, the data may first need to be sent from the first sandboxed computing environment to the workspace via a first transfer, then from the workspace to the second sandboxed computing environment via a second transfer. Some types of sandboxed computing environments may be disallowed from receiving data from other sandboxed computing environments and/or from receiving data from the workspace (e.g., enforced via respective sandbox firewall(s)). Transfers from a sandboxed computing environment to the workspace and/or another sandboxed computing environment may be limited to a predetermined set of transfer types. Transfers from a sandboxed computing environment to the workspace 214 and/or another sandboxed computing environment may require an explicit user input to be initiated.

The trusted host computer system 210 may be configured to connect to a trusted LAN or an untrusted LAN. When the trusted host computer system 210 is connected to the trusted LAN, the host-based firewall 212 may implement a first configuration. When the trusted host computer system 210 is connected to the untrusted LAN, the host-based firewall 212 may implement a second configuration. The first configuration may be associated with blocking incoming traffic to the trusted host computer system 210 that does not come from one or more predefined devices, one or more predefined addresses, and/or via one or more predefined ports. In the first configuration, the host-based firewall 212 may allow outgoing traffic to be sent from one or more processes or applications in the workspace 214, for example irrespective of the type of communication protocol used. In an example, the second configuration may be associated with preventing one or more applications and/or processes operating on the workspace 214 of the trusted host computer system 210 from communicating with one or more untrusted destinations. In an example, the second configuration may be associated with blocking one or more (e.g., all) incoming traffic from the untrusted LAN to the trusted host computer system 210.

When the host-based firewall 212 is configured in the second configuration, the host-based firewall 212 may allow one or more of the applications and/or process operating within the workspace 214 to communicate with a trusted network destination on condition that a predetermined set of communication protocols are utilized. The predetermined set of protocols may include communicating with the trusted network destination via a VPN client associated with the workspace 214. The trusted network destination may be located on the trusted LAN. The VPN client may be configured to establish an encrypted communication system with the trusted network destination via the untrusted LAN. For example, the second configuration of the host-based firewall 212 may enable one or more applications and/or processes operating within the workspace 214 to access the trusted LAN via the untrusted LAN and/or the Internet using the VPN client.

In this manner, the host-based firewall 212 may allow the processes and/or applications of the workspace 214 to send outgoing communications without restriction when implementing the first configuration (e.g., when connected to the trusted LAN). The host-based firewall 212 may limit outgoing communications from the processes and/or applications of the workspace 214 to communications bound for trusted destinations and that also utilize a predetermined protocol in order to communicate with the trusted destination. In both the first and second configurations, the host-based firewall may block incoming communications to the workspace 214 unless the communication is from a trusted destination and uses a predetermined communication protocol.

The workspace 214 may include one or more host monitoring processes configured to monitor operation of the sandbox container process(es). When the host-based firewall 212 is configured in the second configuration, the host-based firewall 212 may allow the at least one host monitoring process to communicate with a trusted central monitoring system, for example in order to communicate information regarding the monitoring one or more of the sandboxed computing environments. The trusted central monitoring system may be located on the trusted LAN. The one or more host monitoring processes may be configured to communicate with the trusted central monitoring system using a predetermined communication protocol that may be permitted by the second configuration of the host-based firewall 212. When at least one host monitoring process is unable to communicate with the trusted central monitoring system, one or more monitoring events may be logged by the one or more host monitoring processes. The one or more host monitoring processes may be configured to send the log to the trusted central monitoring system, for example, upon establishing a communication channel with the trusted central monitoring system.

The operating system 222 may access (e.g., only access) the collective sandboxed computing environment 218 as required for the proper operation of each sandboxed computing environment 218, such as 228, 226, and/or 220. The sandbox firewall 216, for example may be built-in with the sandboxed computing environment 228.

A user may initiate a browser process, an email process, and/or other application processes (e.g., word process) and may enter and/or select a network destination. The trusted host computer system 210 may initiate the browser process in the workspace 214 or a sandboxed computing environment, such as 228, 226, and/or 220. The trusted host computer system 210 may determine whether the network destination is trusted or untrusted. The trusted host computer system 210 may provide access to a trusted network destination via the one or more processes executed in the workspace 214, for example, using a VPN client. The trusted host computer system 210 may provide access to an untrusted network destination via one or more of the sandboxed computing environments, 228, 226, and/or 220. A sandbox container process(es) (e.g., 216, 230, and/or 232, respectively) may be configured to spawn an application process within the correct environment based on the network destination classification, for example trusted or untrusted.

As an example, a sandbox container process (e.g., 232) may determine that a browser process operating in the workspace 214 is attempting to access an untrusted network destination. The sandbox container process 232 may spawn an instance of a sandboxed browser process in the sandboxed computing environment 220 to provide access to the untrusted network destination. As an example, a sandbox container process (e.g., 232) may determine that the browser process operating in the workspace 214 is attempting to access a trusted network destination. The sandbox container process (e.g., 232) may allow the browser process operating in the workspace 214 to access the trusted network destination, for example using a VPN client.

As another example, the sandbox container process 232 may determine that the sandboxed browser process operating in the sandboxed computing environment 220 is attempting to access an untrusted network destination. The sandbox container process 232 may allow the browser process operating in the sandboxed computing environment 220 to access the untrusted network destination. As another example, the sandbox container process 232 may determine that the browser process operating in the sandboxed computing environment 220 is attempting to access a trusted network destination. The sandbox container process 232 may spawn an instance of a browser process in the workspace 214 to provide access to the trusted network destination, for example, using a VPN client.

As an example, a sandbox container process 230 may determine that the sandboxed email process operating in the sandboxed computing environment 226 is attempting to access the sandboxed browser process operating in sandboxed computing environment 220. This may occur when a user is reading an email in a sandboxed computing environment 226 and is clicking a link to a website included in the email. The sandbox container process 230 may be configured to prevent communication (e.g., direct communication) between the two processes, e.g., between the sandboxed browser process running in sandboxed computing environment 220 and the sandboxed email process running in the sandboxed computing environment 226. A sandbox firewall associated with either or both sandboxed computing environments may be configured to prevent such communication. If one or more sandboxed container processes prevent direct communication between one or more sandboxed applications/processes and/or applications/processes operating in other memory spaces, the sandboxed computing environment may be protected (e.g., further protected) from malware. In case of a malware intrusion occurs within a sandboxed computing environment, the infected container (e.g., only the infected container) may be restore to a malware-free version (e.g., pristine copy) instead of restoring all sandboxed computing environments.

In an example, one or more sandbox container process(es) may be configured to allow some communication (e.g., direct communication) between one or more other sandbox container environments (e.g., via a conduit between the container processes) and the workspace 214 which will be described below.

In another example, the sandbox container process(es) may be configured a firewall for one or more (e.g., all) of the sandbox container environments. The firewall may be configured to implement a set of criteria (e.g., rules, policies, and/or protocols) for each individual sandbox container and/or a group of sandbox containers, which will also be described below.

A sandboxed computing environment (e.g., 228, 226, and/or 220) may receive malware from an untrusted network device. For example, the sandboxed computing environment (e.g., 228, 226, and/or 220) may enable direct communication with the untrusted network device on the Internet. The sandboxed computing environment (e.g., 228, 226, and/or 220) may enable indirect communication with the untrusted network device on the Internet (e.g., via a proxy/web-content filter and/or other intermediary device). The untrusted network device may send malware (e.g., malicious software) to the sandboxed computing environment (e.g., 228, 226, and/or 220). The malware may be executed within the sandboxed computing environment (e.g., 228, 226, and/or 220). The executed malware may start one or more processes, download one or more payloads, and/or execute the one or more payloads. The processes and/or payloads may be executed within the sandboxed computing environment (e.g., 228, 226, and/or 220), for example, instead of on the workspace 214 of the operating system 222. When the sandboxed computing environment (e.g., 228, 226, and/or 220) has received malware, the sandboxed computing environment (e.g., 228, 226, and/or 220) may be considered infected and may be considered untrusted.

Even when the sandboxed computing environment (e.g., 228, 226, and/or 220) is infected and/or untrusted, the use of the sandbox based Internet isolation may allow the trusted host computer system 210 to be considered to be uninfected and trusted. The trusted host computer system 210 may be considered uninfected and trusted because the memory space of the sandboxed computing environment (e.g., 228, 226, and/or 220) and the processes operating therein may be separated and isolated from the memory space for the workspace 214 (e.g., the first memory space) of the trusted host computer system 210. The introduced malware may not be able to access the resources, assets, and/or files of the operating system 222 or any other memory space of the host computing device 210. For example, the sandbox firewall 216 may prevent the introduced malware from accessing the resources, assets, and/or files of the operating system 222.

A sandboxed computing environment (e.g., 228, 226, and/or 220) that becomes infected and/or untrusted may encounter problems. The sandbox container process(es) associated with the infected sandboxed computing environment may become inoperable, for example, due to the introduced malware. An infected sandboxed computing environment may restore a pristine copy (e.g., a "clean slate") of the infected sandboxed computing environment (e.g., 228, 226, and/or 220), its associated sandbox container process(es) (e.g., 216, 230, 232 respectively) and/or its separated and isolated memory spaces. An infected sandboxed computing environment may be cleared (e.g., cleared immediately) and reverted to its original, trusted condition. For example, one or more (e.g., all) aspects of the introduced malware may be removed from the sandboxed computing environment (e.g., 228, 226, and/or 220) without any harm to the operating system 222. The sandboxed computing environments may have a clean slate initiated periodically, e.g., once a day, once every 12 hours, once an hour, etc. The sandboxed computing environments may have a clean slate initiated on demand, e.g., based on an indication and/or input received from the user of the trusted host computer system 210. The clean slate may be initiated using a restore capability of the sandboxed computing environment.

For example, the workspace 214 of the trusted host computer system 210 may include at least one host monitoring process. The at least one host monitoring process may be configured to monitor the collective sandboxed computing environment 218 and/or the sandbox container environments (e.g., 220, 226, and/or 228). The at least one host monitoring process may be configured to restore a sandboxed computing environment to a known good version. The at least one host monitoring process may be configured to restore a sandboxed computing environment based on one or more of a user input, an application input, detection of an abnormality in a sandbox container process(es), detection of an abnormality in a sandbox container process(es), or expiration of predetermined period of time (e.g., a timer-based refresh mechanism).

The trusted host computer system 210 may be configured to store a restore point of the collective sandboxed computing environment 218 and/or each sandboxed computing environments (e.g., 220, 226 and/or 228). The restore point may be associated with a configuration of the collective sandboxed computing environment 218 and/or each sandboxed computing environments (e.g., 220, 226 and/or 228). The trusted host computer system 210 (e.g., an application or process operating within the workspace 214) may detect anomalous behavior within the collective sandboxed computing environment 218 and/or each sandboxed computing environments (e.g., 220, 226, and/or 228). The trusted host computer system 210 may restore the collective sandboxed computing environment 218 and/or each sandboxed computing environments (e.g., 220, 226 and/or 228) to the restore point, for example, based on detection of the anomalous behavior.

If malware on an infected sandboxed computing environment is able to access the resources, assets, and/or files of the operating system 222, the trusted host computer system 210 may be considered infected and untrusted. For example, the malware may bypass the sandbox firewall 216 via explicit user input. The host-based firewall 212 may prohibit the introduced malware from communicating with any other device on the untrusted LAN and/or the Internet as shown in FIG. 3. For example, the host-based firewall 212 may be configured to block incoming and/or outgoing traffic from/to the untrusted LAN.

Malware may be introduced to the operating system 222 from a source other than communication with the untrusted LAN and/or the Internet. For example, malware may be introduced to the operating system 222 via an infected email, an infected USB memory stick, and/or another infected hardware device.

An infected and/or untrusted host computer system (e.g., regardless of the introduced malware's vector) may have no communication (e.g., direct communication) with the untrusted LAN and/or the Internet. For example, sandbox container process(es) may be configured to prevent the processes and applications in the workspace 214 from being allowed to access sandboxed computing environments, applications, and/or processes, which may prevent malware introduced into the workspace 214 from communicating with its source or other devices (e.g., via the Internet and/or on the Internet). Without a connection to (e.g., communication with) the untrusted LAN and/or the Internet, the introduced malware may be prevented from performing many toolset functions from within the workspace 214 as described herein or any other function that an enslaved, infected and/or untrusted host computer system may perform. Without a connection to the Internet, the introduced malware may not be able to transfer any data from the infected and/or untrusted host computer system (e.g., the workspace 214) to the untrusted LAN and/or the Internet.

Malware may attempt to circumvent implemented host-based security protections. For example, the introduced malware may attempt to tamper with processes that are critical to the functioning of the host-based security protections. The trusted host computer system 210 may monitor the host-based security protections for tampering (e.g., by way of secondary processes or security applications). The trusted host computer system 210 may determine that one or more host-based security protection related processes have been tampered with, are missing, have stopped, and/or have been otherwise altered. Host-based security protection related processes may include processes associated with the host-based firewall 212 and/or a sandboxed computing environment, as shown by the collective sandboxed computing environment 218 running on the operating system 222. The trusted host computer system 210 may initiate unaltered versions of the tampered, missing, stopped, and/or otherwise altered host-based security protection related processes.

The trusted host computer system 210 may monitor for any exceptions to normal and trusted operations of the trusted host computer system 210. The trusted host computer system 210 may send an alert message to a central monitoring security system (not shown), for example, on the trusted LAN. The alert message may indicate that one or more security protection related processes were restarted (e.g., automatically restarted). The alert message may include such details as required for the proper detection and remediation of the introduced malware.

When the trusted host computer system 210 is not connected (e.g., directly connected) to the trusted LAN, a VPN client may enable communication between one or more secondary processes and the central monitoring security system. For example, the VPN client may be required for successful communication between the secondary processes and the central monitoring security system.

When the trusted host computer system 210 is connected to a trusted LAN, the use of a VPN client for communication between the secondary processes and/or security applications and a central monitoring security system located on the trusted LAN may not be required.

When the trusted host computer system 210 is unable to communicate with the central monitoring security system at the time of an exception alert, the secondary processes and/or security applications may store the exception alert locally. The secondary processes and/or security applications may transfer one or more (e.g., all) exception alert data to the central monitoring security system, for example, when communication is restored between the trusted host computer system 210 and the central monitoring security system.

The trusted host computer system 210 may detect blocked communication attempts and/or exceptions using one or more of an event log or another source.

When an infected and/or untrusted host computer system is detected, remediation may be performed. Remediation may include one or more of analysis of the untrusted host computer system, removal of the introduced malware from the untrusted host computer system, rebuilding of the untrusted host computer system to a trusted configuration, and/or replacing the untrusted host computer system with another trusted host computer system (e.g., such as the trusted host computer system 210).

The trusted host computer system 210 and/or the configuration thereof may limit the adverse effects of received malware. For example, the trusted host computer system 210 may prevent the received malware from using its vector to communicate data from the trusted host computer system 210.

An author of the malware may not be aware of any level of efficacy of the introduced malware, its successful attack vector, and/or any data of an infected host computer system that may have been compromised or collected, for example, because the trusted host computer system 210 may block the workspace 214 from using resources allocated for the sandboxed computing environment 218. The trusted host computer system 210 may block the workspace from accessing untrusted network destinations.

An electronic mail (email) may be exchanged between the trusted host computer system 210 and the trusted LAN. For example, the trusted computer system 210 may send and/or receive email by the trusted host computer system 210 using an email application running in the workspace 214 on the operating system 122 with an intermediary email device (e.g., an email server, an email proxy, and/or the like) on the trusted LAN via a VPN client. In another example, the trusted computer system 210 may send and/or receive email by the trusted host computer system 210 using an email application running in the sandboxed computing environment 226 with an intermediary email device (e.g., an email server, an email proxy, and/or the like) on the trusted LAN via a VPN client. Email may be exchanged between the trusted host computer system 210 and the Internet through a web browser application, for example running in the sandboxed computing environment 220.

When the trusted host computer system 210 is not connected (e.g., directly connected) to a trusted LAN, a VPN client may be used for an email exchange between the trusted host computer system 210 and an email server located on the trusted LAN.

One or more files may be exchanged between the trusted host computer system 210 and untrusted network destinations, for example devices on the Internet. The files may be exchanged using an intermediary secure transfer device (e.g., a transfer server, a transfer appliance, and/or the like). The intermediary secure transfer device may be located within a trusted LAN.

The trusted host computer system 210 may exchange files with an untrusted network destination, for example a device on the Internet. The files may be transferred from the trusted host computer system 210 and/or an untrusted network destination to the intermediary secure transfer device. A file transfer may be initiated from the trusted host computer system 210 and/or from the device on the Internet. The file transfer may utilize an encrypted protocol via a predetermined network port. Authenticity of the file transfer may be validated, for example, prior to any data transfer.

For example, files may be copied using Secure Socket Shell (SSH), Secure Socket Shell File Transfer Protocol (SFTP), or Hyper Text Transfer Protocol Secure (HTTP). Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the trusted host computer system 210.

One or more files may be uploaded or downloaded via the sandboxed application operating in a sandboxed computing environment (e.g., 220, 226, or 228). The file(s) may be transferred between the collective sandboxed computing environment 218 and/or each sandboxed computing environments (e.g., 220, 226 and/or 228) and the workspace 214. For example, the collective sandboxed computing environment 218 and/or each sandboxed computing environments (e.g., 220, 226 and/or 228) may enable a user initiated file transfer to the workspace 214. The file(s) may be transferred to the workspace 214 based on a received user selection. The file(s) may have been exchanged with a device on the Internet to the trusted host computer system 210 (e.g., the collective sandboxed computing environment 218 and/or each sandboxed computing environments (e.g., 220, 226 and/or 228)). The file transfer from the device on the Internet to the trusted host computer system 210 may use an encrypted protocol (e.g., the same encrypted protocol as that used when files are transferred from the trusted host computer system 210 to the device on the Internet) via a predetermined network port. Authenticity of the file(s) and/or the device may be validated, for example, prior to any data transfer.

The trusted host computer system 210 may be configured to enable cutting and/or copying text displayed in the collective sandboxed computing environment 218 and/or each sandboxed computing environments (e.g., 220, 226 and/or 228) and pasting the cut and/or copied text within a program running in the workspace 214. The trusted host computer system 210 may be configured to enable printing from the collective sandboxed computing environment 218 and/or each sandboxed computing environments (e.g., 220, 226 and/or 228) to a local printer (not shown).

Figure 4:
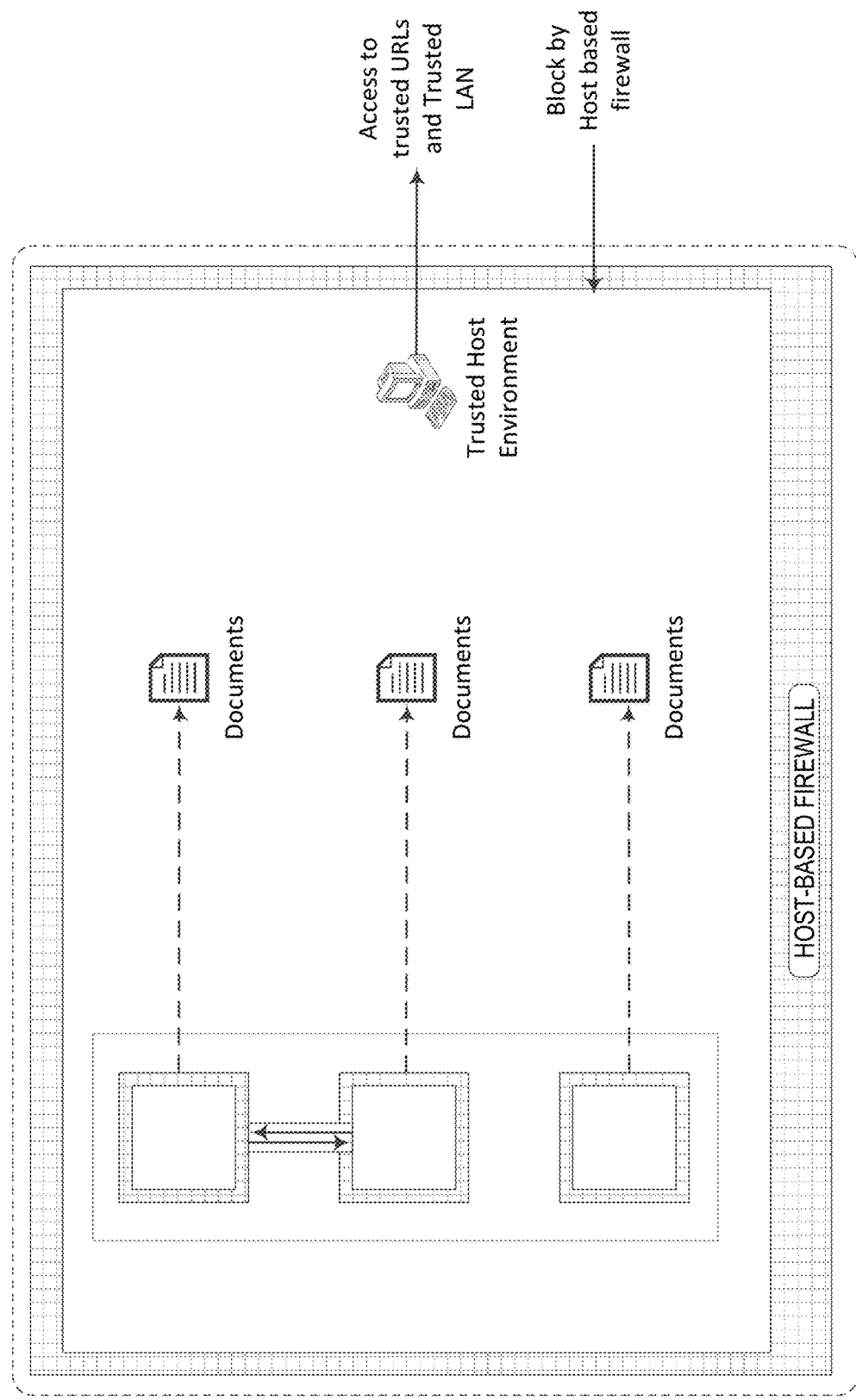
FIG. 4 depicts an example networked computer system having a host computer system using a plurality of sandbox based internet isolation systems, where one or more sandboxed applications have direct communications (e.g., via a conduit).

FIG. 4 depicts an example networked computer system connected to a LAN (e.g., a trusted LAN or an untrusted LAN). The networked computer system shown in FIG. 4 may include one or more (e.g., all) of the descriptions herein for the networked computer system connected to the trusted LAN or the untrusted LAN (e.g., FIG. 2 or FIG. 3, respectively). In an example, a sandboxed computing environment may be configured to implement a set of criteria (e.g., set of rules) to allow a communication (e.g., direct communication) between one or more other memory spaces (e.g., memory spaces associated with corresponding sandboxed computing environment), shown in FIG. 4. For example, a memory space (e.g., first memory space that is configured for a first sandboxed computing environment) may allow communication with another memory space (e.g., second memory space that is configured for a second sandboxed computing environment or memory space for a workspace). In examples, a sandboxed computing environment for an email process may communicate (e.g., communicate directly) with a sandboxed computing environment for one or more applications, such as a sandboxed word processor. As described herein, communication from a first memory space to a second memory space may occur if one or more set of criteria (e.g., set of rules) have been satisfied. For example, a first set of criteria may be satisfied for outgoing communication from a first memory space to a second memory space, and a second set of criteria may be satisfied for incoming communication from a first memory space to a second memory space. In examples, the first set of criteria may be the same as the second set of criteria.

In an example, if a user receives an email with a document as an attachment in the sandbox email computing environment (e.g., sandbox email process), the user may be able to open the document in the sandbox application computing environment (e.g., sandbox word processing) via a direct communication between the two sandboxed computing environments. One or both sandboxed computing environments may implement a set of criteria (e.g., set of rules) where their associated sandbox firewalls allow this type of file transfer between the two sandboxed computing environments. The sandboxed computing environment(s) may have a predetermined list of authorized communications between one or more memory spaces and their associated applications and/or processes. The sandboxed computing environment(s) may determine whether the communications between one or more memory spaces and their associated applications and/or processes are safe and/or appropriate, for example in real-time.

If the sandboxed computing environment(s) determines that the type of attachment in the email, for example, does not match with the preconfigured and/or predetermined file types, appropriate application request, and/or other criteria to allow communication, the sandbox container process(es) may not implement a set of criteria (e.g., set of rules) to allow a communication (e.g., direct communication) between the one or more memory spaces (e.g., associated with one or more sandboxed computing environments). For example, if the user receives an email with a document as an attachment, the sandbox container process(es) may determine that the document is one of the predetermined file type and may establish a connection with the appropriate sandboxed computing environment and application (e.g., sandbox word processor). One or more sandbox container process(es) may be limited to implement a set of criteria (e.g., set of rules) when (e.g., only when) one or more conditions associated with the set of criteria have been satisfied. Thus, a sandboxed computing environment configured to run a sandbox email process, for example, may not establish (e.g., block) a connection with other sandboxed computing environment and/or associated sandbox application (e.g., sandbox web browsing process) to open a document attachment in an email.

The sandbox email process and the sandbox word processing may be provided as an exemplary manner and may be substituted and/or combine with one or more of other memory spaces that are configured to run one or more sandbox applications or processes (e.g., via corresponding sandboxed computing environment).

Figure 5:
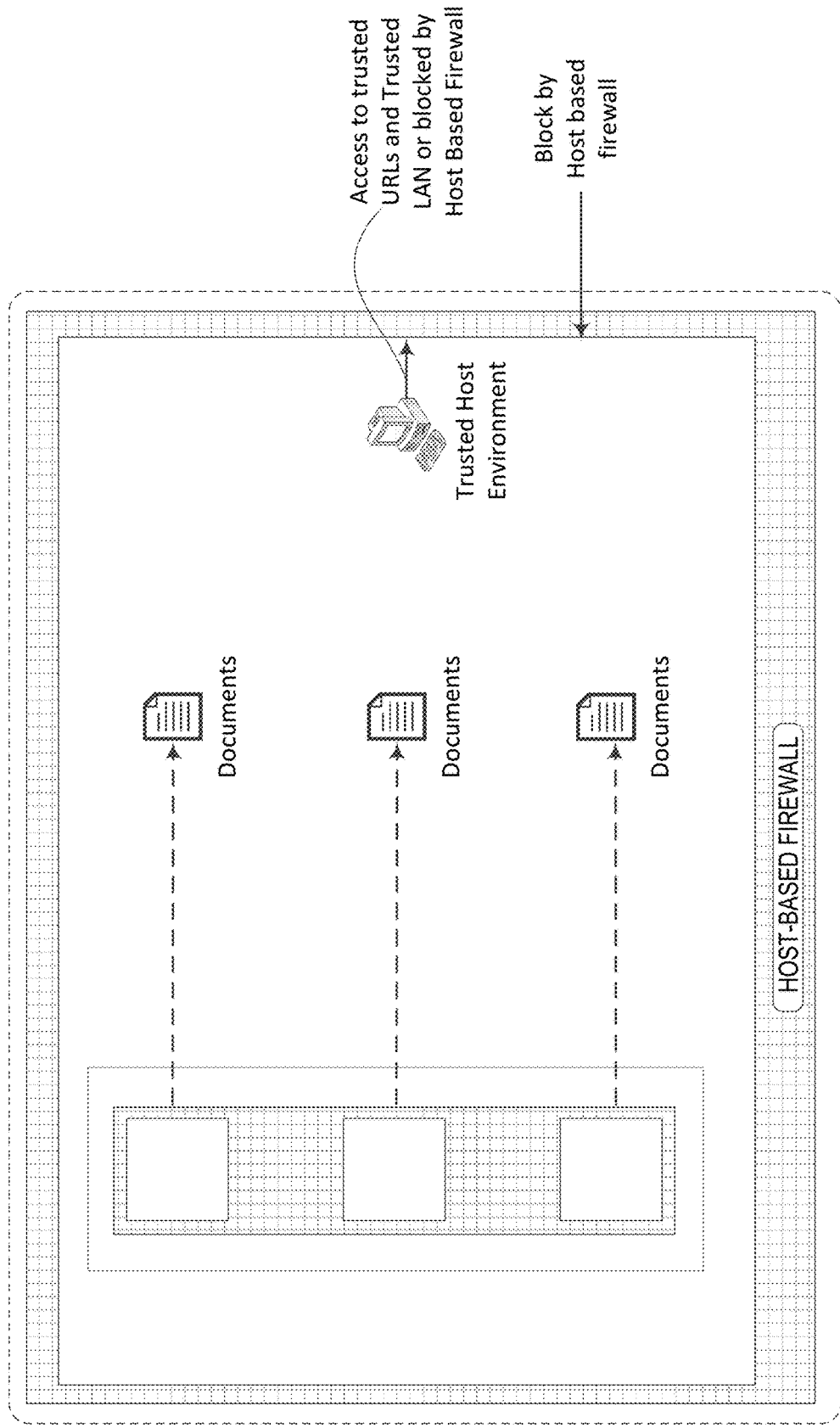
FIG. 5 depicts an example networked computer system having a host computer system using a plurality of sandbox based internet isolation systems where a single firewall interface is configured to provide firewall interface for a plurality of sandbox container processes.

FIG. 5 depicts an example networked computer system connected to a LAN. The networked computer system shown in FIG. 5 may be connected to a trusted LAN and/or an untrusted LAN. The networked computer system shown in FIG. 5 may include one or more (e.g., all) of the descriptions provided herein of the networked computer system connected to the trusted LAN or the untrusted LAN (e.g., FIG. 2 or FIG. 3 respectively). In an example, a firewall (e.g., a single sandbox firewall or an isolation firewall) may be configured to implement one or more set of criteria (e.g., rules) for one or more (e.g., all) memory spaces (e.g., memory space for one or more corresponding sandboxed computing environments). The single sandbox firewall may be configured to implement a set of criteria (e.g., rules) to separate (e.g., isolate) from one or more (e.g., other) sandboxed computing environments and their associated applications (e.g., similar to FIG. 2 and/or FIG. 3 where each sandbox application is separated/isolated from other sandbox applications via having no direct communication). This may be referred to a first configuration of the firewall for the single sandbox firewall.

The single sandbox firewall may be configured to implement one or more set of criteria (e.g., rules) to one or more specific sandbox containers. For example, the firewall may apply one or more policies and/or protocols associated with the set of criteria (e.g., rules) on one or more sandbox container process(es). The single sandbox firewall may establish a connection between two or more sandbox containers and may allow communications (e.g., direct communications) between two or more sandbox containers and/or the associated and appropriate sandbox container processes. This may be referred to a second configuration of the firewall of the sandbox container process(es).

For example, if a user wants to attach a document in an email, the firewall may implement the second configuration of the firewall (e.g., to allow communications between two or more sandboxed computing environments and their applications and/or processes). The firewall may implement one or more set of criteria (e.g., rules) to allow a file transfer between a sandboxed computing environment for email process and a sandboxed computing environment for application process (e.g., sandbox word processing). The one or more set of criteria (e.g., rules) may allow communication (e.g., direct communication) between the sandboxed computing environment for email processing and the sandboxed computing environment for word processing and their applications and/or processes (e.g., without any further configurations). The user may be able to attach the document in the email in the sandboxed computing environment. While the single sandbox firewall may allow implementing this set of criteria (e.g., rules) for the sandbox email process and the sandbox word process, the single sandbox firewall may prevent one or more (e.g., all) other communications between other computing environments and applications and/or processes (e.g., besides the sandbox email process computing environment and the sandbox word process computing environment) residing in different memory spaces. Once the user completes attaching the document and sends the email, the single sandbox firewall may revert back to the first configuration. Communication between one or more sandbox containers and other memory spaces may stay in the first configuration until other applications trigger the firewall to apply one or more set of criteria (e.g., different set of rules) to allow communications between the memory spaces and their associated applications.

For another example, if a user clicks a link embedded in an email, the firewall may implement a different set of criteria (e.g., rules) to allow communication (e.g., direct communication) between the sandboxed computing environments for email processing and web browsing process. The single sandbox firewall may switch from the first configuration to the second configuration to allow the direct communications between the two sandboxed computing environments and their associated applications and/or processes. Unlike the processes of attaching the document in the email, the sandbox container process(es) may not revert back to the first configuration (e.g., first configuration of the single sandbox firewall) once the user clicks and opens the website from the sandbox email process. For example, the single sandbox firewall may not revert back to the first configuration (e.g., immediately) when the user opens the website in the sandbox web browsing container. For example, the communication between the sandbox containers and their associated applications (e.g., the sandbox email process computing environment and the sandbox web process computing environment) may be permitted until the user inputs a comment, a certain period of time passes, and/or some other criteria is met to trigger the single sandbox firewall to revert back to the first configuration. This may allow the users to open up more than one link embedded in the email without the sandboxed computing environment switching repeatedly between configurations. For example, by allowing continued and limited direct communication between the two containers, the sandboxed computing environment may be able to save some resources.

One or more exemplary set of criteria (e.g., rules) for the firewall may be configured to apply to a group of applications at a time. In other example, one or more exemplary set of criteria (e.g., rules) for the firewall may be configured to apply to one or more groups of applications simultaneously.

The sandboxed computing environments described herein may be replaced with VM computing environment(s). For example, one or more (e.g., all) isolated sandboxed computing environment and associated applications and/or processes may be replaced with one or more isolated VM computing environment. The VM computing environment may have similar firewall implementation as the sandboxed computing environment as described herein.

Implementing one or more (e.g., all) of the applications/processes via the VM computing environment(s) may use large resources (e.g., relatively large resources in comparison with the sandboxed computing environment). Thus, the sandboxed computing environment(s) may be combined with the VM computing environment(s). As described herein, one or more sandbox process applications in the sandboxed computing environment(s) may be configured to combine with one or more VM computing environment(s) as described herein. The host computing system may balance the amount of resources that the VM computing environment(s) may use with those the sandboxed computing environment(s) may use. For example, the host computing system may determine one or more applications/processes that may require further protections (e.g., such as applications for monitoring keystrokes). The host computing system may implement a VM computing environment(s) to such applications/processes. One or more (e.g., other) applications/processes may be implemented using the sandboxed computing environment(s). For example, the host computing system may be configured to apply VM computing environment(s) to one or more applications/processes that may need further protection (e.g., against malware) and may apply sandboxed computing environment(s) to one or more applications/processes (e.g., to reduce resource consumption). As described above, the usage of different and/or segregated computing environment types may provide better protection against malware (e.g., by further insulating some application/processes), while maintaining the user experience (e.g., by minimizing host system resource consumption).

The networked computer systems 100, 200 described herein may be implemented using software, hardware, and/or any combination thereof.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A host computer system configured to connect to a network, wherein the host computer system comprises:
    a memory; and
    a processor configured to:
        implement a host operating system that enables operation of a trusted workspace, the trusted workspace configured to enable operation of a first set of one or more applications or processes using a trusted memory space;
        implement a first sandboxed computing environment that uses the host operating system and that is configured to enable operation of a second set of one or more applications or processes using a first untrusted memory space;
        implement a second sandboxed computing environment that uses the host operating system and that is configured to enable operation of a third set of one or more applications or processes using a second untrusted memory space;
        isolate the first sandboxed computing environment and the second sandboxed computing environment from the trusted workspace that uses the trusted memory space using an isolation firewall;
        isolate the first sandboxed computing environment that uses the host operating system from the second sandboxed computing environment that uses the host operating system using the isolation firewall such that data can be communicated from the first sandboxed computing environment to the second sandboxed computing environment on a condition; and
        isolate the trusted workspace from at least one network destination using a host-based firewall, the host-based firewall being configured to block a data communication sent to the trusted workspace from the at least one network destination.

2. The host computer system of claim 1, wherein the isolation firewall is further configured to allow data being communicated from the first sandboxed computing environment to the trusted workspace when a first criteria is met, and wherein the isolation firewall is further configured to allow data being communicated from the second sandboxed computing environment to the trusted workspace when a second criteria is met.

3. The host computer system of claim 1, wherein the isolation firewall is further configured to block data being communicated from the trusted workspace to the first sandboxed computing environment, and wherein the isolation firewall is further configured to block data being communicated from the trusted workspace to the second sandboxed computing environment.

4. The host computer system of claim 1, wherein the condition is a first condition where a first criteria is met, and wherein the isolation firewall is further configured to allow data being communicated from the second sandboxed computing environment to the first sandboxed computing environment on a second condition that a second criteria is met.

5. The host computer system of claim 4, wherein the isolation firewall is further configured to block data being communicated from the second sandboxed computing environment to the first sandboxed computing environment on a third condition, and wherein the isolation firewall is further configured to block data being communicated from the first sandboxed computing environment to the second sandboxed computing environment on a fourth condition.

6. The host computer system of claim 1, wherein the condition is a first condition, and wherein the isolation firewall is further configured to allow data being communicated from the second sandboxed computing environment to the first sandboxed computing environment when the first condition and a second condition are both met.

7. The host computer system of claim 1, wherein the condition is a first condition and wherein on a second condition that a set of criteria is not met, the isolation firewall is further configured to block data being communicated from the first sandboxed computing environment to the trusted workspace, from the second sandboxed computing environment to the trusted workspace, from the first sandboxed computing environment to the second sandboxed computing environment, and from the second sandboxed computing environment to the first sandboxed computing environment.

8. The host computer system of claim 1, wherein the isolation firewall is further configured to allow a data communication when an explicit user input is received that authorizes the isolation firewall to allow the data communication, wherein the data communication is from the trusted workspace to the first sandboxed computing environment, the trusted workspace to the second sandboxed computing environment, or the first sandboxed computing environment to the second sandboxed computing environment.

9. The host computer system of claim 1, wherein the host-based firewall is further configured to allow the data communication from the at least one network destination via at least the second set of one or more applications or processes associated with the first sandboxed computing environment.

10. The host computer system of claim 1, wherein at least one process associated with the first sandboxed computing environment is a browser process and at least one process associated with the second sandboxed computing environment is an email process.

11. A host computer system configured to connect to a network, wherein the host computer system comprises:
   a memory; and
   a processor configured to:
      implement an operating system that enables operation of a workspace, the workspace configured to enable operation of a first set of one or more applications or processes via a first memory space;
      implement a plurality of isolated computing environments, the plurality of isolated computing environments comprising a first isolated computing environment that is configured to enable operation of a second set of one or more applications or processes via a second memory space, and a second isolated computing environment that is configured to enable operation of a third set of one or more applications or processes via a third memory space;
      isolate the first isolated computing environment from at least the workspace and from the second isolated computing environment using a first isolation firewall such that data can be communicated from the first isolated computing environment to the second isolated computing environment on a condition, wherein the first isolation firewall that is associated with the first isolated computing environment;
      isolate the second isolated computing environment from at least the workspace and from the first isolated computing environment using a second isolation firewall that is associated with the second isolated computing environment; and
      isolate the workspace from at least one network destination using a host-based firewall, the host-based firewall is configured to block a data communication sent to the workspace from the at least one network destination.

12. The host computer system of claim 11, wherein the host-based firewall is further configured to allow the data communication from the at least one network destination via at least the second set of one or more applications or processes associated with the first isolated computing environment.

13. The host computer system of claim 11, wherein the condition is a first condition, and wherein the first isolation firewall is further configured to block data being communicated from the workspace to the first isolated computing environment on a second condition, and wherein the second isolation firewall is further configured to allow data being communicated from the second isolated computing environment to the workspace on a third condition, and wherein the second isolation firewall is further configured to block data being communicated from the workspace to the second isolated computing environment on a fourth condition.

14. The host computer system of claim 11, wherein the condition is that a first set of criteria is met, and wherein the first isolation firewall is further configured to block data being communicated from the second isolated computing environment to the first isolated computing environment when a subset of the first set of criteria is met, and wherein the second isolation firewall is further configured to allow data being communicated from the second isolated computing environment to the first isolated computing environment when a second set of criteria is met while a subset of the second set of criteria is configured to block data being communicated from the first isolated computing environment to the second isolated computing environment.

15. The host computer system of claim 11, wherein the second isolation firewall is configured to allow data being communicated from the second isolated computing environment to the first isolated computing environment on a condition that a first and a second set of criteria is met.

16. The host computer system of claim 11, wherein the condition is a first condition and wherein on a second condition that a set of criteria is not met, at least the first isolation firewall or the second isolation firewall are further configured to block data being communicated from at least one of the first isolated computing environment to the workspace, the second isolated computing environment to the workspace, the first isolated computing environment to the second isolated computing environment, or the second isolated computing environment to the first isolated computing environment.

17. The host computer system of claim 11, wherein the first isolation firewall or the second isolation firewall is further configured to allow a data communication when an explicit user input is received that authorizes at least the first isolation firewall or the second isolation firewall to allow the data communication, wherein the data communication from the workspace to the first isolated computing environment, the workspace to the second isolated computing environment, or the first isolated computing environment to the second isolated computing environment.

18. A method for a host computer system to connect to a network, wherein the method comprises:
   implementing a host operating system that enables operation of a trusted workspace via the host computer system, the trusted workspace configured to enable operation of a first set of one or more applications or processes using a trusted memory space;
   implementing a first sandboxed computing environment that uses the host operating system and that is configured to enable operation of a second set of one or more applications or processes using a first untrusted memory space;
   implementing a second sandboxed computing environment that uses the host operating system and that is configured to enable operation of a third set of one or more applications or processes using a second untrusted memory space;
   isolating the first sandboxed computing environment and the second sandboxed computing environment from the trusted workspace that uses the trusted memory space using an isolation firewall;
   isolating the first sandboxed computing environment that uses the host operating system from the second sandboxed computing environment that uses the host operating system using the isolation firewall such that data can be communicated from the first sandboxed computing environment to the second sandboxed computing environment on a condition; and
   isolating the trusted workspace from at least one network destination using a host-based firewall, the host-based firewall is configured to block a data communication sent to the trusted workspace from the at least one network destination.

* * * * *